United States Patent
Jöngren et al.

(10) Patent No.: US 9,673,957 B2
(45) Date of Patent: Jun. 6, 2017

(54) SYSTEM AND METHOD FOR PROVIDING INTERFERENCE CHARACTERISTICS FOR INTERFERENCE MITIGATION

(71) Applicant: Telefonaktiebolaget L M Ericsson (publ), Stockholm (SE)

(72) Inventors: George Jöngren, Sundbyberg (SE); Bo Lincoln, Lund (SE); Stefania Sesia, Roquefort les Pins (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 14/490,256

(22) Filed: Sep. 18, 2014

(65) Prior Publication Data

US 2015/0098411 A1    Apr. 9, 2015

Related U.S. Application Data

(60) Provisional application No. 61/879,809, filed on Sep. 19, 2013.

(51) Int. Cl.
*H04W 28/04* (2009.01)
*H04L 5/00* (2006.01)
(Continued)

(52) U.S. Cl.
CPC ......... *H04L 5/0073* (2013.01); *H04B 7/0456* (2013.01); *H04B 7/0482* (2013.01);
(Continued)

(58) Field of Classification Search
CPC .................................................. H04W 28/04
See application file for complete search history.

(56) References Cited

U.S. PATENT DOCUMENTS

| 2010/0195600 A1 | 8/2010 | Gorokhov et al. |
| 2010/0309861 A1 | 12/2010 | Gorokhov et al. |

(Continued)

FOREIGN PATENT DOCUMENTS

| EP | 2 605 585 A1 | 6/2013 | ............ H04W 36/00 |
| WO | WO 2012/150880 | 11/2012 | ............ H04W 36/00 |
| WO | WO 2013/133751 | 9/2013 | |

OTHER PUBLICATIONS

PCT Written Opinion of the International Preliminary Examining Authority for International application No. PCT/IB2014/064665, Oct. 7, 2015.

(Continued)

*Primary Examiner* — Omar Ghowrwal
*Assistant Examiner* — Angel Brockman
(74) *Attorney, Agent, or Firm* — Baker Botts, LLP

(57) ABSTRACT

According to certain embodiments, methods and systems include providing interference characterization data by a network node to a first wireless device for use in performing interference mitigation. The network node may provide telecommunications services for a first wireless device associated with the network node. Characteristic data may be identifying by the network node. The characteristic data may be associated with at least one characteristic of an interfering signal associated with a second wireless device. The characteristic data may be transmitted to the first wireless device and may identify a precoder granularity configured for least one physical resource block pair associated with the interfering signal.

44 Claims, 14 Drawing Sheets

(51) Int. Cl.
H04W 72/04 (2009.01)
H04B 7/0456 (2017.01)
H04B 7/04 (2017.01)
H04B 7/024 (2017.01)
H04B 7/06 (2006.01)

(52) U.S. Cl.
CPC ......... *H04L 5/0035* (2013.01); *H04W 72/042* (2013.01); *H04B 7/024* (2013.01); *H04B 7/0486* (2013.01); *H04B 7/066* (2013.01)

(56) References Cited

U.S. PATENT DOCUMENTS

| | | |
|---|---|---|
| 2011/0182256 A1 | 7/2011 | Fodor et al. |
| 2012/0122440 A1 | 5/2012 | Krishnamurthy et al. |
| 2012/0275530 A1* | 11/2012 | Nazar .................. H04B 7/022 375/267 |
| 2013/0077507 A1 | 3/2013 | Yu et al. |
| 2013/0194931 A1* | 8/2013 | Lee .................. H04L 5/0053 370/241 |
| 2013/0194950 A1 | 8/2013 | Haghighat et al. |
| 2013/0223403 A1 | 8/2013 | Chen et al. |
| 2013/0250879 A1* | 9/2013 | Ng .................. H04W 72/042 370/329 |
| 2015/0264594 A1* | 9/2015 | Davydov .............. H04W 72/12 370/252 |

OTHER PUBLICATIONS

PCT Notification of Transmittal of the International Search Report and the Written Opinion of the International Searching Authority, or the Declaration for International Application No. PCT/IB2014/064965, Int'l filing date: Sep. 30, 2014; Ref. P41151-WO1, Date of mailing Feb. 18, 2015.
Thomas Kürner et al., "Final Report on Self-Organisation and its Implications in Wireless Access Networks (SOCRATES Deliverable D5.9)", Jan. 17, 2010 (Jan. 17, 2010), INFSO-ICT-216284 SOCRATES D5.9; retrieved from internet: URL:http://www.fp7-socrates.org/files/Deliverables/SOCRATES_D5.9 Final report on self-organisation and its implications in wireless access networks.pdf [retrieved on Aug. 28, 2012] abstract, Jan. 17, 2010.
PCT Notification of Transmittal of the International Search Report and the Written Opinion of the International Searching Authority, or the Declaration for International application No. PCT/IB2014/064670, Feb. 25, 2015.
PCT Notification of Transmittal of the International Search Report and the Written Opinion of the International Searching Authority, or the Declaration for International application No. PCT/IB2014/064673, Feb. 25, 2015.
PCT Notification of Transmittal of the International Search Report and the Written Opinion of the International Searching Authority, or the Declaration for International application No. PCT/IB2014/064665, Feb. 17, 2015.
PCT Notification of Transmittal of the International Search Report and the Written Opinion of the International Searching Authority, or the Declaration for International application No. PCT/IB2014/064667, Feb. 20, 2015.
U.S. Appl. No. 14/490,211, filed Sep. 18, 2014, Jöngren.
U.S. Appl. No. 14/490,291, filed Sep. 18, 2014, Jöngren.
U.S. Appl. No. 14/490,434, filed Sep. 18, 2014, Jöngren.
LTE; Evolved Universal Terrestrial Radio Access (E-UTRA); Physical channels and modulation (3GPP TS 36.211 version 11.0.0 Release 11), Oct. 2012.
LTE; Evolved Universal Terrestrial Radio Access (E-UTRA); Multiplexing and channel coding (3GPP TS 36.212 version 11.3.0 Release 11), Jul. 2013.
LTE; Evolved Universal Terrestrial Radio Access (E-UTRA); Physical layer procedures (3GPP TS 36.213 version 11.3.0 Release 11), Jul. 2013.
LTE; Evolved Universal Terrestrial Radio Access (E-UTRA) and Evolved Universal Terrestrial Radio Access Network (E-UTRAN); Overall description; Stage 2 (3GPP TS 36.300 version 11.6.0 Release 11), Jul. 2013.
"A Simple Transmit Diversity Technique for Wireless Communications" by Siavash M. Alamouti; IEEE Journal on Select Areas in Communications, vol. 16, No. 8, Oct. 1998.
"Space-Time Block Codes from Orthogonal Designs" by Vahid Tarokh, Hamid Jafarkhani, and A.R. Calderbank; IEEE Transactions on Information Theory, vol. 45, No. 5, Jul. 1999.

* cited by examiner

SYSTEM AND METHOD FOR PROVIDING INTERFERENCE CHARACTERISTICS FOR INTERFERENCE MITIGATION

RELATED APPLICATIONS

This nonprovisional patent application claims priority to U.S. Provisional Patent Application No. 61/879,809, filed Sep. 19, 2013 and entitled "Interference Mitigation Receivers Field."

TECHNICAL FIELD

Particular embodiments relate generally to wireless communications and more particularly to a system and method for providing interference characteristics for interference mitigation.

BACKGROUND

To meet higher capacity demands and to enhance user experience, cellular communications networks are increasing the number of base stations employed. One approach for increasing the density of base stations is achieved by cell splitting macro cells in highly loaded geographical areas. Specifically, the macro cell may be split into multiple small cells in highly loaded geographical areas. These highly loaded areas may be considered traffic hotspots within the coverage area of the macro cell. This densification of the underlying support for the cellular network may allow radio resources to be reused. Additionally, because wireless devices may be closer to the serving base station, wireless devices may achieve higher bitrates.

Another approach for meeting high capacity demands is to employ a mixture of macro cells and small cells with overlapping coverage areas within the cellular network. This type of cellular network may be referred to as heterogeneous networks (HetNets). Such networks may be an important complement to macro cell splitting. One example includes a cellular network having clusters of pico cells within the macro coverage area to offload macro traffic. A pico base station provides service to a pico cell. Typically, a pico base station is a low power node (LPN) that transmits with low output power and covers a much smaller geographical area than a high power node, such as a macro base station. Other examples of low power nodes are home base stations and relays.

Though the presence of additional base stations increases system performance and improves user experiences, such networks are not without its disadvantages. One such disadvantage may be that the wireless devices served by the network may experience lower geometries. As a result, downlink inter-cell interference may be more pronounced and the achievable bit rates may be limited. To mitigate inter-cell interference, mitigation techniques have been employed to improve user performance. Such techniques may explore the structure of the physical layer transmission of the radio access technology.

Interference mitigation may take place on the transmitter side, the receiver side, or on both sides. Interference mitigation on the transmitter side includes those methods that seek to coordinate the physical channel transmissions across cells to avoid severe interference. For example, an aggressor base station may occasionally mute its transmissions on certain radio resources in order for a victim base station to schedule interference sensitive wireless devices on radio resources with reduced interference.

LTE features that seek to coordinate transmissions, on the network side, have been specified in the context of inter-cell interference coordination (ICIC) and coordinated multipoint transmissions (CoMP). In the case of ICIC, for example, a network node such as an eNodeB may send a message over the LTE inter-eNB interface (X2). The message may include coordination information that a receiving network node, such as another eNodeB, may use when scheduling interference sensitive wireless devices. As such, competing transmissions may be coordinated to avoid inter-point interference. As another example, CoMP may use a cluster of transmission points, or base stations, to jointly and synchronously transmit the same signals to a and thereby increase the received power on the desired signals.

The following ICIC messages over X2 have been specified in TS 36.423:
  Uplink (UL) Overload Interference Indication (OII) indicates the interference level (low, medium, high) per resource block (RB) experienced by the indicated cell on all RBs.
  UL High Interference Indication (HII) indicates the occurrence of high interference sensitivity per RB, as seen from the sending eNodeB.
  Received Narrow Transmit Power (RNTP) indicates per RB whether DL transmission power is lower than the value indicated by a threshold.
  Almost Blank Subframe (ABS) pattern indicates the subframes on which the sending eNodeB will reduce power for some physical channels and/or reduced activity.

The X2 messages OII, HII and RNTP represent methods for coordinating physical data channel transmissions in the frequency domain across cells. In contrast, the ABS message is a time domain mechanism to primarily protect reception of PDCCH, PHICH and PDSCH in the small cells by letting macro cells occasionally mute or reduce transmit power on PDCCH/PDSCH in certain subframes. The eNodeB ensures backwards compatibility towards wireless devices by continuing transmission of necessary channels and signals in the ABS pattern for acquiring system information and time synchronization.

On the receiver side, advanced receivers employing enhanced interference suppression schemes, maximum likelihood techniques and interference cancellation techniques are gaining popularity. Such advanced receivers operate to mitigate downlink (DL) interference arising from neighbor-cell transmissions to wireless devices in neighboring cells. Specifically, such receivers may explicitly remove all or parts of the interfering signal.

Generally, such receivers may be categorized into 3 families:
  Linear receivers whose aim is to suppress the interference by exploiting an explicit channel estimation of the interfering signal(s).
  Non-linear receivers such as ML detection (iterative or non-iterative).
  Interference Cancellation (IC) receivers which explicitly cancel the interference from the received signal. IC receivers may be linear or non-linear, iterative or One specific type of receiver may use interference rejection combining (IRC) for mitigating inter-cell interference. IRC is a technique for suppressing interference, which requires estimation of an interference/noise covariance matrix. Another type of receiver for mitigating interference may include interference cancellation (IC) receivers that operate to estimate unwanted signals (intra/inter-cell interference). As an example, an IC receiver in the victim wireless device may operate to demodulate and optionally decode the interfering signals, produce an estimate of the transmitted and the corresponding received signal, and remove that estimate from the total received signal to improve the effective signal-to-noise ratio (SINR) for the desired signal. In post-decoding IC receivers, the interfering data signal is demodulated, decoded, its estimated contribution to the received signal is regenerated, and subtracted. In pre-decoding receivers, the regeneration step is performed directly after demodulation, bypassing the channel decoder. The preferred mode to perform such cancellation may include applying soft signal mapping and regeneration rather than hard symbol or bit decisions. Additionally or alternatively, maximum likelihood receivers may be used to jointly detect the desired signals and the interference signals in accordance to the maximum likelihood criterion. Iterative maximum likelihood receivers may be defined to exploit the decoding of the interfering signals.

Both IRC and IC are wireless device reference receiver techniques in LTE. However, IC in LTE is restricted to cancellation of always-on signals, such as the CRS, in which the network assists the wireless device on how these signals are transmitted in the aggressor cells. The two interference cancellation approaches differ by the achievable cancellation efficiency. Stated differently, the fraction of the impairment power left after the cancellation operation may be essentially equal in some scenarios and vary significantly in others. While the post-decoding IC approach may provide superior performance at "high" SIR operating points, these approaches have differing computational resource requirements. For example, the described post-decoding solution implies turbo decoding processing. Additionally, the processing delay incurred may vary by technique. For example, the post-decoding solution requires buffering the entire code block of the interfering signal.

To apply these advanced interference cancellation techniques to signals originating from other cells, knowledge of certain signal format parameters may be required to configure the receiver. For pre-decoding IC, the resource allocation, modulation format, any pre-coding applied, the number of layers, etc. may be useful, and may be obtained via blind estimation, eavesdropping other-cell control signaling, or via NW assistance features. For post-decoding, additional transport format parameters are required which may typically only be obtained from receiving or eavesdropping the related control signaling.

However, the different types of receivers may require differing information and/or parameters and are required to estimate blindly all the parameters needed for the receiver implementation. Additionally, the multitude of communication standards applicable to LTE may include many features which may need to be supported by the wireless device but which will not be used by a network (depending on the configuration) and may make blind detection difficult and complex. Currently no signaling is defined in LTE standard in order to provide wireless devices with the assistance which may be needed in order to implement advanced receivers with limited complexity.

SUMMARY

According to some embodiments, systems and methods are provided that include providing interference characterization data by a network node to a first wireless device for use in performing interference cancellation.

In one example embodiment, a method for providing interference characterization data by a network node to a first wireless device for use in performing interference mitigation is provided. The network node may provide telecommunications services for a first wireless device associated with the network node. Characteristic data may be identifying by the network node. The characteristic data may be associated with at least one characteristic of an interfering signal associated with a second wireless device. The characteristic data may be transmitted to the first wireless device and may identify a precoder granularity configured for least one physical resource block pair associated with the interfering signal.

In one example embodiment, a network node for providing interference characterization data may include a memory containing executable instructions and one or more processors in communication with the memory. The one or more processors operable to execute the instructions to cause the network node to provide telecommunications services for a first wireless device associated with the network node. Characteristic data associated with at least one characteristic of an interfering signal associated with a second wireless device may be identified. The characteristic data associated with the interfering signal associated with the second wireless device may be transmitted to the first wireless device. The at least one characteristic may identify a precoder granularity configured for least one physical resource block pair associated with the interfering signal.

In another example embodiment, a method for using interference characterization data by a first wireless device for interference mitigation may include receiving characteristic data identifying at least one characteristic of an interfering signal intended for a second wireless device. The at least one characteristic may identify a precoder granularity configured for least one physical resource block pair associated with the interfering signal. The characteristic data comprising the at least one characteristic may be used to form an estimate of some characteristic related to the interfering signal. The interfering signal intended for the second wireless device may be mitigated based on the estimate of the some characteristic related to the interfering signal. The at least one characteristic may identify a precoder granularity configured for least one physical resource block pair associated with the interfering signal.

In still another example embodiment, a first wireless device for using interference characterization data by a first wireless device for interference mitigation may include a memory containing executable instructions and one or more processors in communication with the memory. The one or more processors operable to execute the instructions to cause the first wireless device to receive characteristic data identifying at least one characteristic of an interfering signal intended for a second wireless device. The at least one characteristic may identify a precoder granularity configured for least one physical resource block pair associated with the interfering signal. The characteristic data comprising the at least one characteristic may be used to form an estimate of some characteristic related to the interfering signal. The interfering signal intended for the second wireless device may be mitigated based on the estimate of the some characteristic related to the interfering signal. The at least one characteristic may identify a precoder granularity configured for least one physical resource block pair associated with the interfering signal.

Some embodiments of the disclosure may provide one or more technical advantages. For example, in certain embodiments, the systems and methods allow wireless devices to spend less effort on blind estimation and detection of various characteristics of the interference when performing various forms of interference cancellation and/or mitigation techniques. As a result, one technical advantage may be that the reduction of effort by a wireless device lowers device complexity. An additional technical advantage may be increased performance since the provided characterization data decreases the search space that a wireless device must consider. Accordingly, the risk of making erroneous estimation and detection is decreased. Still another advantage may be that battery consumption by the wireless device may be lowered. Still yet another advantage may that designers of wireless devices may apply tighter tolerances and/or thresholds to various blind estimation and detection techniques.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments are described in FIGS. 1-16 of the drawings, like numerals being used for like and corresponding parts of the various drawings.

Figure 1:
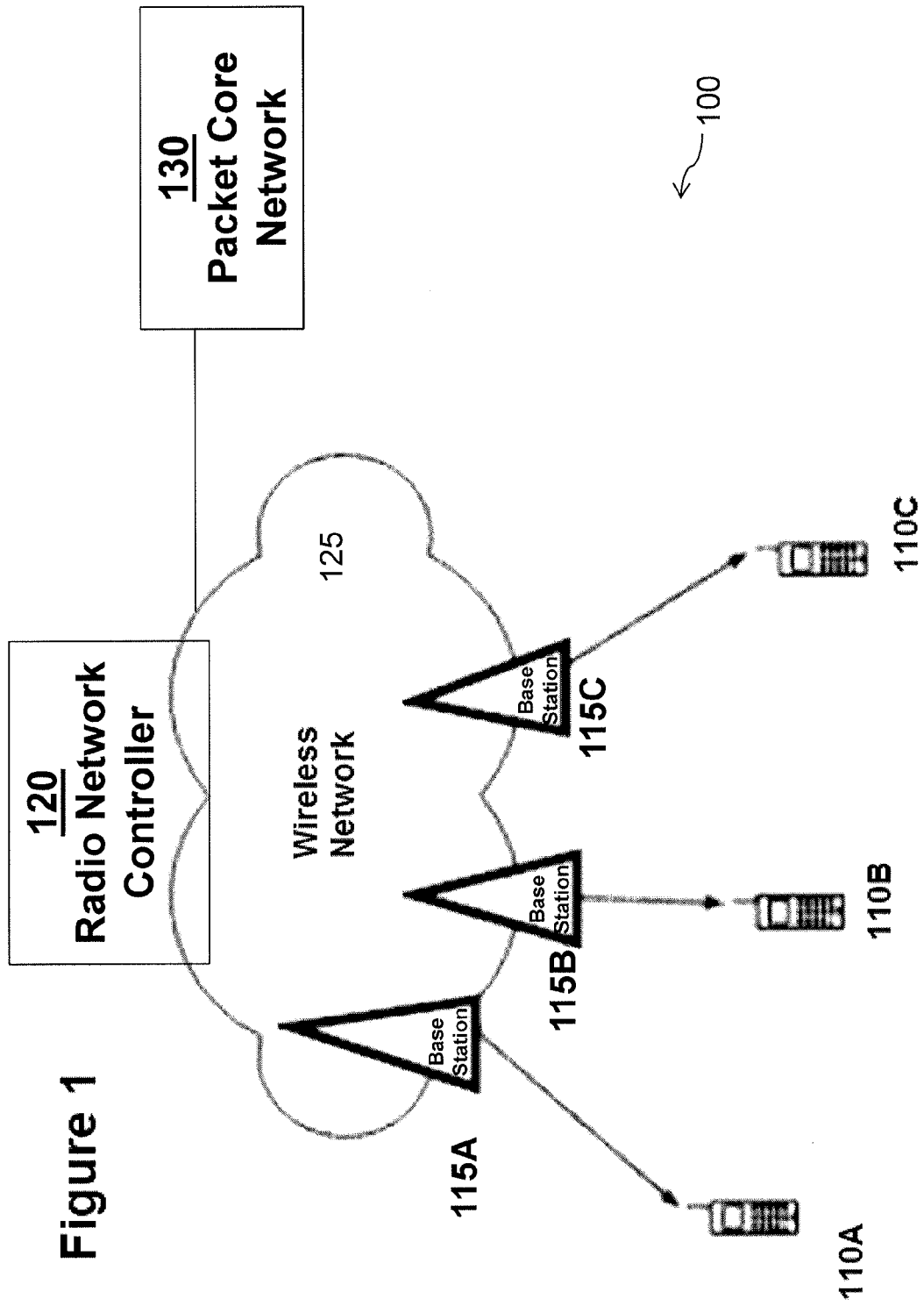
FIG. 1 is a block diagram illustrating an embodiment of a wireless telecommunications network, according to certain embodiments.

FIG. 1 is a block diagram illustrating embodiments of a radio network 100 that includes one or more wireless devices 110, radio network nodes 115, radio network controller 120, and core network nodes 130. A wireless device 110 may communicate with a radio network node 115 over a wireless interface 125. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network.

As described above, example embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of wireless device 110, radio network node 115, and network nodes (such as radio network controller 120 or core network node 130) are described with respect to FIGS. 14, 15, and 16 below, respectively.

The terms wireless device 110 and network node 115, as used herein, are considered general terms and are intended to be considered as non-limiting. For example, "network node" may correspond to any type of radio network node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as 3GPP Long Term Evolution (LTE) technology, which is a mobile broadband wireless communication technology in which transmissions from radio network nodes 115, which may include base stations such as those referred to as eNBs in particular embodiments, to wireless devices, which may also be referred to as user equipment (UE), are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot). A unit of one subcarrier and 1 OFDM symbol is referred to as a resource element (RE). However, it is generally recognized that the disclosure is not limited to 3GPP LTE or other provided examples and other embodiments could use different radio access technologies.

Figure 2:
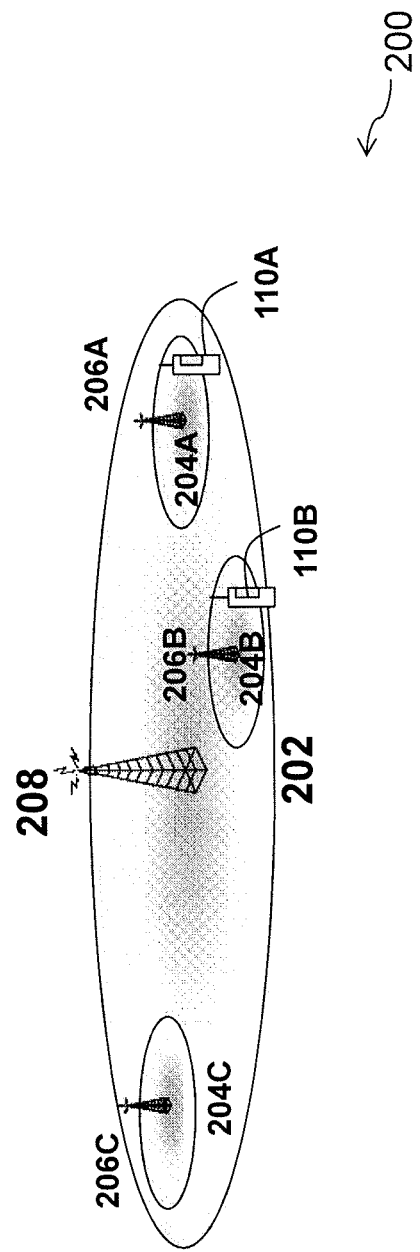
FIG. 2 is a schematic diagram of an example wireless telecommunications network deploying macro and pico cells, according to certain embodiments.

In order to meet higher capacity demands, the network 100 may comprise a heterogeneous network that includes a mixture of cells of different sizes and overlapping coverage areas. FIG. 2 is a schematic diagram of an example wireless telecommunications network 200 deploying macro cell 202 and pico cells 204, according to certain embodiments. As illustrated, network 200 includes one macro cell 202 that includes multiple pico cells 204A-C deployed within the coverage area of macro cell 202. In particular embodiments, pico cells 204A-C may be served by lower power nodes 206A-206C that consume less power than network node 208. For example, whereas network node 208 serving macro cell 202 may be associated with an output power of 46 dBm, a lower power node 206A-C may be associated with an output power of 30 dBm or less. The large difference in output power may result in a different interference situation than what is seen in networks where all base stations have the same output power. Other examples of low power nodes, also referred to as points, in heterogeneous networks are home base stations and relays.

An objective of using low power nodes 206A-C within macro cell 202 is to improve system capacity by means of cell splitting gains. Another objective is to provide users with wide area experience of very high speed data access throughout network 200. Heterogeneous deployments are particularly effective in covering traffic hotspots, which may include small geographical areas with high user densities served by lower power nodes 206A-C, and represent an alternative deployment to denser macro networks.

Certain embodiments may apply frequency separation between the different layers of network 200. Thus, in a particular embodiment, macro cell 202 and pico cells 204A-C may operate on different non-overlapping carrier frequencies and thereby avoid any interference between the layers. With no macro cell interference towards the under laid cells, cell splitting gains may be achieved when all resources may simultaneously be used by the macro cell 202 and pico cells 204A-C. However, a disadvantage of operating layers on different carrier frequencies may be resource-utilization inefficiency. For example, when activity levels in the pico cells 204A-C are low, network 200 may be operated more efficiently using all carrier frequencies in macro cell 202 and disregarding pico cells 204A-C. However, because the split of carrier frequencies across layers is typically done in a static manner, operation of network 200 may not be adjusted based on the activity levels in pico cells 204A-C.

Another related technique for operating heterogeneous network 200 efficiently is to share radio resources on same carrier frequencies by coordinating transmissions across macro cell 202 and pico cells 204A-C. This type of coordination refers to as inter-cell interference coordination (ICIC) in which certain radio resources are allocated for the macro cells during some time period whereas the remaining resources can be accessed by the under laid cells without interference from the macro cell. Depending on the traffic situations across the layers, this resource split can change over time to accommodate different traffic demands. In contrast to operating network 200 using a split of carrier frequencies between the macro cell 202 and pico cells 204A-C, the ICIC sharing radio resources across layers can be made more or less dynamic depending on the implementation of the interface between network node 208 and low power nodes 206A-C. For example, in LTE, an X2 interface has been specified in order to exchange different types of information between network node 208 and low power nodes 206A-C. One example of such information exchange is that each low power node 206A-C may be capable of informing other low power nodes 206A-C and network node 208 that it will reduce its transmit power on certain resources. However, time synchronization between low power nodes 206A-C is required to ensure that ICIC across layers will work efficiently in heterogeneous network 200. This is in particular of importance for time domain based ICIC schemes where resources are shared in time on the same carrier.

Figure 3:
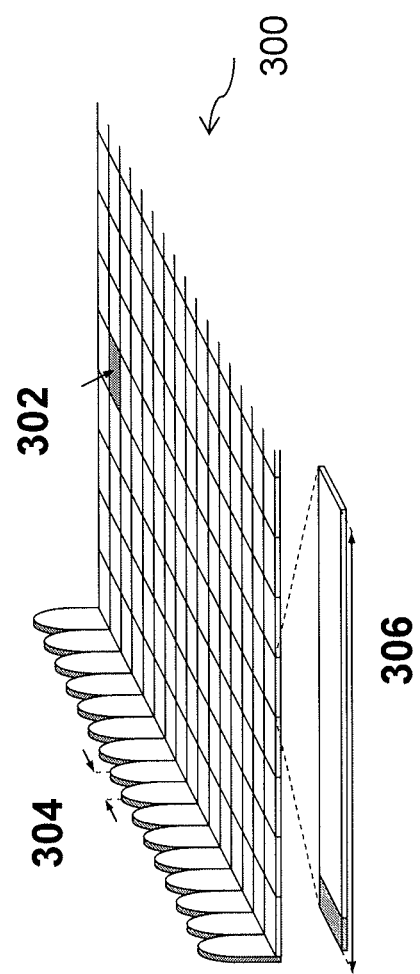
FIG. 3 is a schematic diagram of example downlink physical resources in LTE, according to certain embodiments.

In certain embodiments, the physical layer transmission in LTE network 200 may be OFDM in the downlink and DFT-spread OFDM in the uplink. FIG. 3 is a schematic diagram of example downlink physical resources 300 in LTE, according to certain embodiments. In the example embodiment, the basic LTE physical resources 300 can thus be seen as a time-frequency grid. Each resource element 302 may correspond to one subcarrier 306 during one OFDM symbol interval 304.

Figure 4:
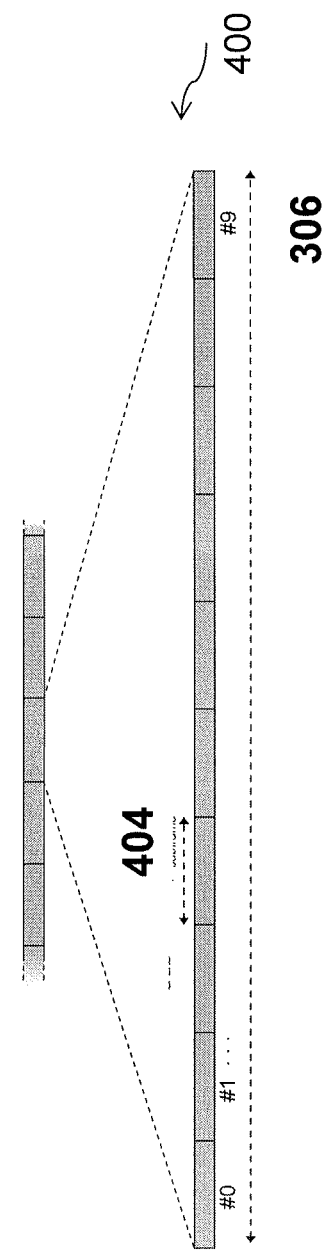
FIG. 4 is a schematic diagram of an example of the time-domain structure in LTE, according to certain embodiments.

FIG. 4 is a schematic diagram of an example of the time-domain structure 400 in LTE, according to certain embodiments. In the time domain, LTE downlink transmissions are organized into radio frames 306, such as that depicted in FIG. 3. In a particular embodiment, each radio frame 306 may be 10 ms and may consist of ten equally-sized subframes 404 of 1 ms. A subframe may be divided into two slots, each of 0.5 ms time duration.

In certain embodiments, the resource allocation in the LTE network may be described in terms of resource blocks (RB). A RB may correspond to one slot in the time domain and 12 contiguous 15 kHz subcarriers in the frequency domain, in a particular embodiment. Two consecutive RBs in time may be considered an RB pair and may correspond to the time interval upon which scheduling operates.

Transmissions in LTE may be dynamically scheduled in each subframe where the radio network node, such as radio network node 115, transmits downlink assignments and uplink grants to wireless devices 110 via the physical downlink control channel (PDCCH) or the enhanced PDCCH (ePDCCH). In LTE downlink, data is carried by the physical downlink shared channel (PDSCH) and in the uplink the corresponding link may be referred to as the physical uplink shared channel (PUSCH). The PDCCHs are transmitted in the first OFDM symbol(s) in each subframe and may span (more or less) the whole system bandwidth. In contrast, ePDCCH is mapped on RBs within the same resource region as used for PDSCH. Hence, ePDCCHs are multiplexed in the frequency domain with the PDSCH and may be allocated over the entire subframe. In certain embodiments, a wireless device 110 that has decoded an assignment carried by a PDCCH or ePDCCH may know which resource elements in the subframe that contain data aimed for the radio network node 115. Similarly, upon receiving an uplink grant, wireless device 110 may also know upon which time/frequency resources that wireless device 110 should transmit.

In various embodiments, wireless device 110 demodulates the data received. Demodulation of the data may require estimation of the radio channel. This estimation may be done using transmitted reference symbols (RS) that are known by the receiving wireless device 110. In an LTE-specific network 100, cell specific reference symbols (CRS) are transmitted in all downlink subframes. Additionally, to assist downlink channel estimation, the CRS are also used for mobility measurements performed by wireless devices 110. An LTE-specific network 100 may also support wireless device-specific RS. As such, demodulation reference signals (DMRS) may be provided for the purpose assisting channel estimation for demodulation.

Figure 5:
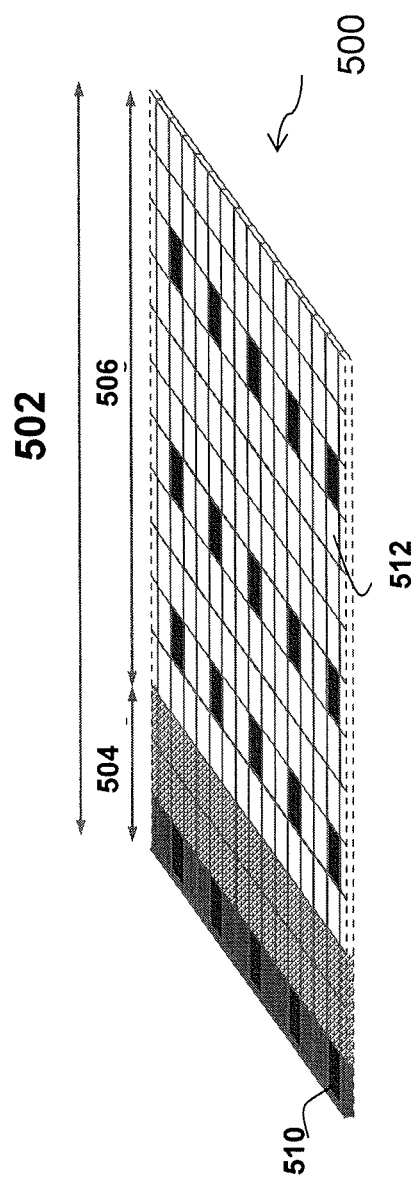
FIG. 5 is a schematic diagram of an example mapping of PDCCH, PDSCH, and CRS within an LTE downlink subframe, according to certain embodiments.

FIG. 5 is a schematic diagram of an example mapping 500 of PDCCH, PDSCH, and CRS within an LTE downlink subframe 502, according to certain embodiments. In the depicted example embodiment, the PDCCHs occupy a control region 504 of subframe 502. For example, control region 504 may include the first three possible OFDM symbols in subframe 502. As a result, the mapping of data carried by PDSCH could start already at the second OFDM symbol. Since the CRS is common to all wireless devices 110 in the cell, the transmission of CRS cannot be easily adapted to suit the needs of a particular wireless device 110. In contrast to DMRS described above, cell-specific reference signals 510 associated with each wireless device 110 may be placed in data region 506 as part of PDSCH. In an LTE-specific network 100, each subframe 502 may be configured as an MBSFN subframe. As a result, within each subframe 502, CRSs 510 may only be present in the control region 504.

In certain embodiments, the length of the PDCCH control region 504 may vary on subframe-by-subframe basis and may be conveyed to wireless device 110 in the physical control format indicator channel (PCFICH). The PCFICH is transmitted within control region 504, at locations known by the wireless devices 110. After a wireless device 110 has decoded the PCFICH, wireless device 110 then knows the size of control region 504 and in which OFDM symbol the data transmission starts. The physical hybrid-ARQ indicator channel (PHICH) may also be transmitted in control region 504. This channel carries ACK/NACK responses to wireless device 110 to inform wireless device 110 as whether the uplink data transmission in a previous subframe 502 was successfully decoded by the receiving network node 115.

Figure 6:
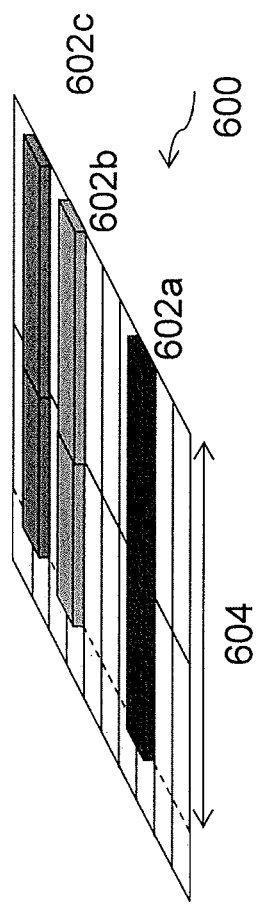
FIG. 6 is a schematic diagram of a downlink subframe, according to certain embodiments.

FIG. 6 is a schematic diagram of a downlink subframe 600, according to certain embodiments. As illustrated, UE-specific transmission of control information 602 in the form of enhanced control channels. The enhanced control channels may be implemented by the transmission of generic control messages to a wireless device 110 using such transmissions based on UE-specific reference signals and by placement of the control data 602 in the data region 506 of the subframe 502. In the specific embodiment depicted in FIG. 6, downlink subframe 600 includes ten resource block pairs 604 and configuration of three enhanced PDCCH regions 602A-C. In one particular example, each enhanced PDCCH region 602A-C may be the size of 1 PRB 604 pair. The remaining RB pairs can be used for PDSCH transmissions.

Figure 7:
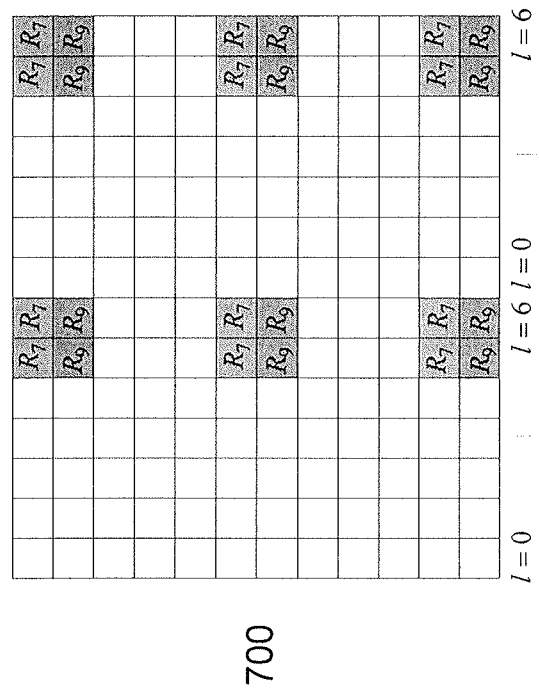
FIG. 7 is a schematic diagram of an example UE-specific reference symbol assignment used for ePDCCH in LTE, according to certain embodiments.

FIG. 7 is a schematic diagram of an example UE-specific reference symbol assignment 700 used for ePDCCH in LTE, according to certain embodiments. In the depicted example, the enhanced control channel uses antenna port p∈{107,108, 109,110} for demodulation. Thus, the reference symbols represented by R7 and R9 of assignment 700 are associated with the DMRS corresponding to antenna ports 107 and 109, respectively. Antenna port 108 and 100 may be obtained by applying an orthogonal cover as (1,−1) over adjacent pairs of R7 and R9, respectively. One benefit of UE-specific reference symbols in the data region may be that precoding gains may be achieved for the control channels. Another advantage may be that different PRB pairs 604 (as depicted by example in FIG. 6) may be allocated to different cells or different transmission points within a cell. As a result, inter-cell or inter-point interference coordination may be achieved between control channels in certain embodiments. This technique may be especially useful in a HetNet scenario, which is discussed in greater detail below.

It may be recognized that CRS may not be the only reference symbols available in an LTE-specific network 100. Other RS that may be available include device-specific RS for demodulation of PDSCH. Additionally, RS providing channel state information (CSI) feedback from a wireless device 110 may be available. The latter RS is referred to as CSI-RS.

CSI-RS may not be transmitted in every subframe 604 and are generally sparser in time and frequency than RS used for demodulation. For example, in certain embodiments, CSI-RS transmissions may occur every 5th, 10th, 20th, 40th, or 80th subframe 604 according to an RRC configured periodicity parameter and/or an RRC configured subframe offset.

In certain embodiments, a wireless device 110 operating in connected mode can be requested by the radio network node 115 to perform channel state information (CSI) reporting. Such a request may include a request for wireless device 110 to report a suitable rank indicator (RI), one or more precoding matrix indices (PMIs) and a channel quality indicator (CQI) to radio network node 115. Additionally or alternatively, other types of CSI may be requested, including explicit channel feedback and interference covariance feedback.

In certain embodiments, CSI feedback assists radio network node 115 in scheduling. For example, CSI feedback may assist radio network node 115 in determining the subframe and RBs for the transmission, which transmission scheme/precoder to use, as well as provide information on a proper user bit rate for the transmission. In LTE, both periodic and aperiodic CSI reporting is supported. In the case of periodic CSI reporting, wireless device 110 reports the CSI measurements on a configured periodical time basis on the physical uplink control signaling (PUCCH). In contrast, in the case of aperiodic reporting, the CSI feedback is transmitted on the physical uplink shared channel (PUSCH) at pre-specified time instants after receiving the CSI grant from the base station. With aperiodic CSI reports, radio network node 115 may request CSI reflecting downlink radio conditions in a particular subframe. A multitude of these and other feedback modes are available. Depending upon the particular implementation, radio network node 115 may configure wireless device 110 to report according to one feedback mode on PUSCH and another on PUCCH. The aperiodic modes on PUSCH are referred to as PUSCH 1-2, 2-0, 2-2, 3-0, 3-1, respectively and the periodic ones on PUCCH as 1-0, 1-1, 2-0, 2-1, respectively, in certain embodiments.

Figure 8A:
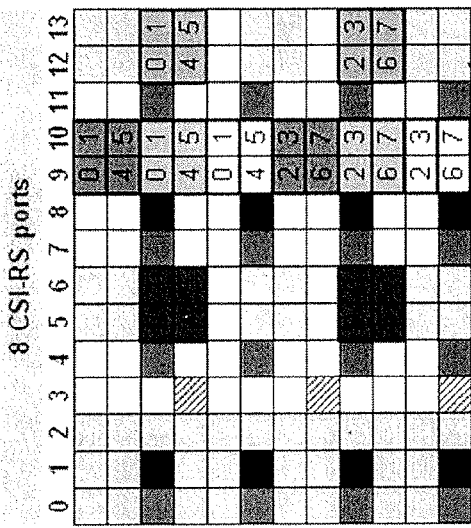
FIGS. 8A, 8B, and 8C are schematic diagrams of example resource element grids over a resource block pair showing potential positions for reference signals, according to certain embodiments.
Figure 8B:
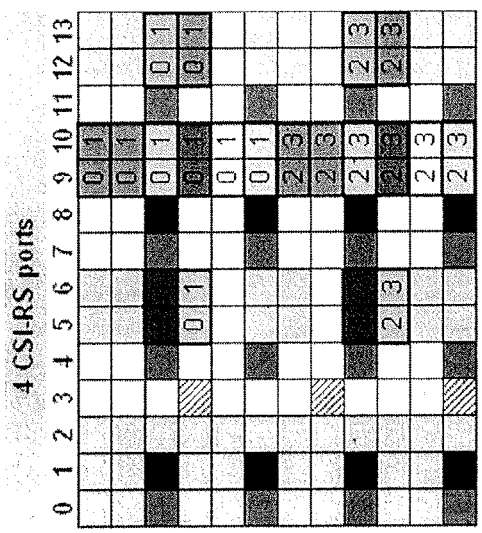
Figure 8C:
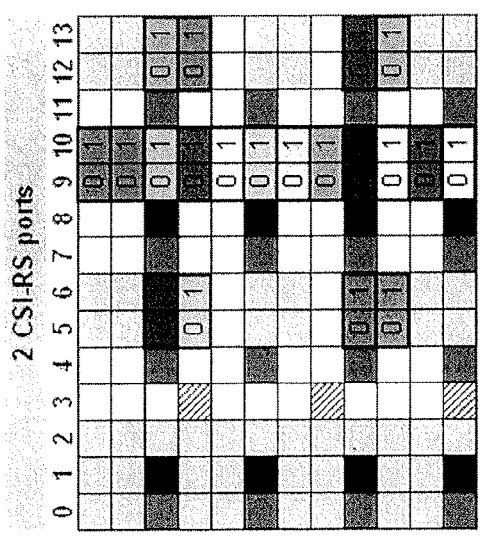

FIGS. 8A, 8B, and 8C are schematic diagrams of example resource element grids 800, 802, and 804 over a resource block pair showing potential positions for reference signals, according to certain embodiments. Specifically, FIGS. 8A, 8B, and 8C show example resource element grids 800, 802, and 804, depicting potential positions for device-specific RS, CSI-RS (marked with a number corresponding to the CSI-RS antenna port), and CRS (blue and dark blue). The CSI-RS may utilize an orthogonal cover code of length two to overlay two antenna ports on two consecutive resource elements. As seen, many different CSI-RS patterns are available. For the case of 2 CSI-RS antenna ports in grid 802, it may be recognized that there are 20 different patterns within a subframe. The corresponding number of patterns is 10 for grid 802 having 4 CSI-RS antenna ports and 5 for grid 804 having 8 CSI-RS antenna ports. For TDD, additional CSI-RS patterns may be available.

A CSI-RS resource may correspond to a particular pattern present in a particular subframe. For example, two different patterns in the same subframe or the same CSI-RS pattern but in different subframes constitute two separate CSI-RS resources.

The CSI-RS patterns may also correspond to so-called zero-power CSI-RS, also referred to as muted resource elements. Zero-power CSI-RS corresponds to a CSI-RS pattern whose resource elements are silent, i.e., there is no transmitted signal on those resource elements. Such silent patterns are configured with a resolution corresponding to the 4 antenna port CSI-RS patterns such as grid 802. Hence, the smallest unit to silence may correspond to four resource elements.

The purpose of zero-power CSI-RS is to raise the signal-to-noise ratio for CSI-RS in a cell by configuring zero-power CSI-RS in interfering cells so that the resource elements otherwise causing the interference are silent. Thus, a CSI-RS pattern in a certain cell is matched with a corresponding zero-power CSI-RS pattern in interfering cells. Raising the signal-to-noise-ratio level for CSI-RS measurements is particularly important in applications such as coordinated multi point (CoMP) or in heterogeneous deployments. In CoMP, wireless device 110 is likely to need to measure the channel from non-serving cells and interference from the much stronger serving cell would in that case be devastating. Zero-power CSI-RS may also be needed in heterogeneous deployments where zero-power CSI-RS in the macro-layer is configured so that it coincides with CSI-RS transmissions in the pico-layer. This avoids strong interference from macro nodes when wireless devices measure the channel to a pico node.

The PDSCH may be mapped around the resource elements occupied by CSI-RS and zero-power CSI-RS. As such, it may be important that both the network node 115 and wireless device 110 are assuming the same CSI-RS/zero power CSI-RS configuration or else wireless device 110 may be unable to decode the PDSCH in subframes containing CSI-RS or their zero-power counterparts.

Before an LTE-type wireless device 110 can communicate with an LTE network, the wireless device 110 must find and acquire synchronization to a cell within the network. Stated differently, the wireless device 110 must perform a cell search. The wireless device 110 then receives and decodes system information needed to communicate with and operate properly within the cell, and finally access the cell by means of the so-called random-access procedure.

In order to support mobility, wireless device 110 must continuously search for, synchronize with, and estimate the reception quality of both its serving cell and neighbor cells. The reception quality of the neighbor cells, in relation to the reception quality of the current cell, is then evaluated in order to conclude if a handover (for a wireless device 110 in connected mode) or cell re-selection (for a wireless device 110 in idle mode) should be carried out. For wireless devices 110 in connected mode, the handover decision is made by network components based on measurement reports provided by the wireless devices 110. Examples of such reports are reference signal received power (RSRP) and reference signal received quality (RSRQ).

Depending on how these measurements are used, the wireless device 110 may be connected to the cell with the strongest received power, in certain scenarios. Alternatively, wireless device 110 may be connected to the cell with the best path gain. In some embodiments, a compromise may be reached between the strongest received power and the best path gain. These and other selection strategies may not result in the same selected cell as output powers of cells of different types are different. This is sometimes referred to as link imbalance. For example, returning to FIG. 2, the output power of a pico low power node 206A-C or a relay may be on the order of 30 dBm or less while a macro radio network node, such as radio network node 208 may have an output power of on the order of 46 dBm. Consequently, even in the proximity of the pico cell 204A-C, the downlink signal strength from the macro cell 202 may be larger than that of the pico cell 204A-C. From a downlink perspective, it may be better to select cell based on downlink received power, whereas from an uplink perspective, it would be better to select cell based on the path loss.

Figure 9:
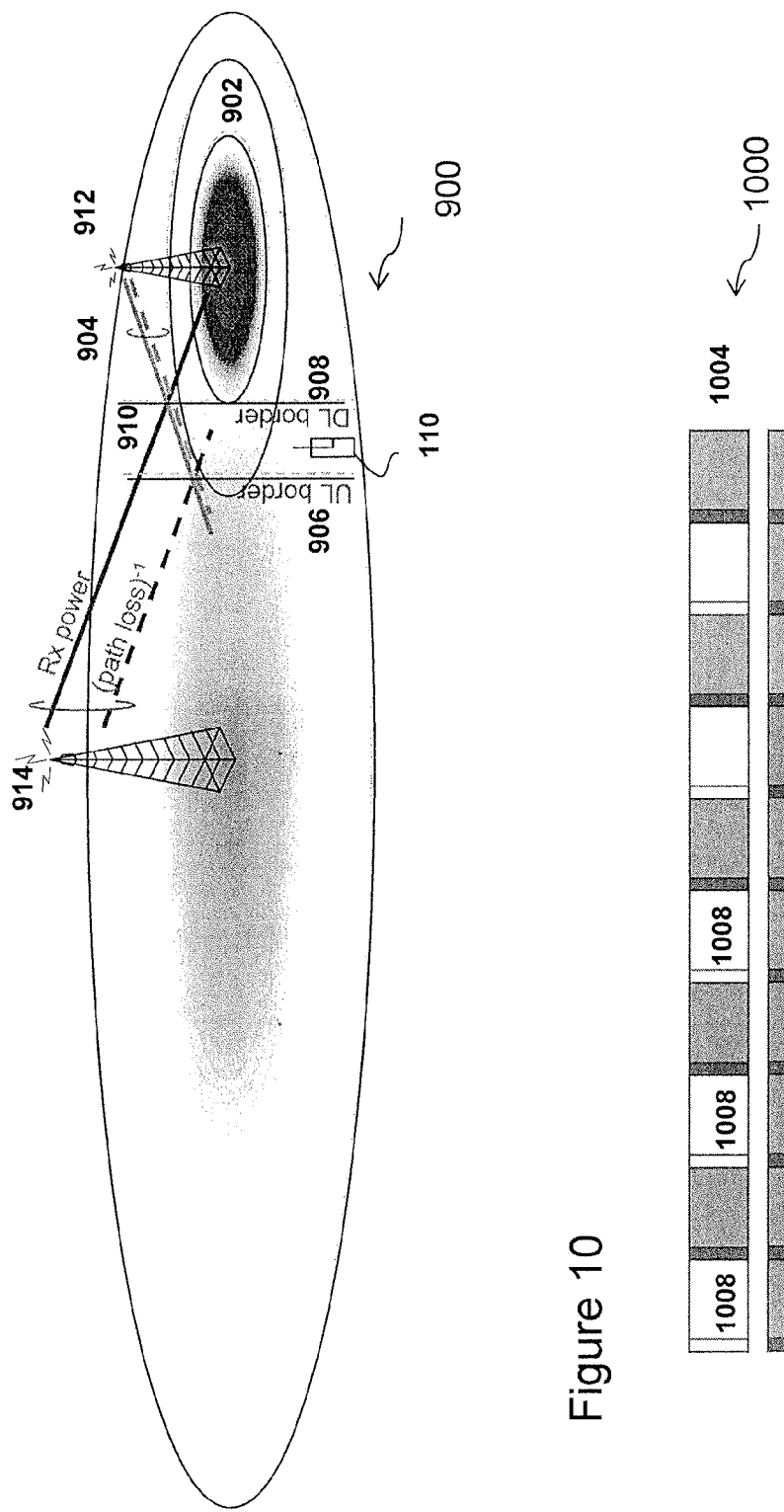
FIG. 9 is a schematic diagram of an example uplink and downlink coverage in a heterogeneous cell scenario, according to certain embodiments.

FIG. 9 is a schematic diagram of an example uplink and downlink coverage 900 in a heterogeneous cell scenario, according to certain embodiments. Consider the above described scenario where it might be a better case, from a system perspective to connect to the pico cell 902 even if the macro downlink is much stronger than the pico cell downlink. However, ICIC may be needed when wireless devices 110 operate within the region between the UL border 906 and the DL border 908 since this region may be considered a link imbalance zone 910. Some form of interference coordination across the cell layers is especially important for the downlink control signaling. If the interference is not cancelled or otherwise mitigated, wireless devices 110 in the imbalance zone 910 and served by the pico radio network node 912 may not receive the downlink control signaling from pico radio network node 912.

Figure 10:
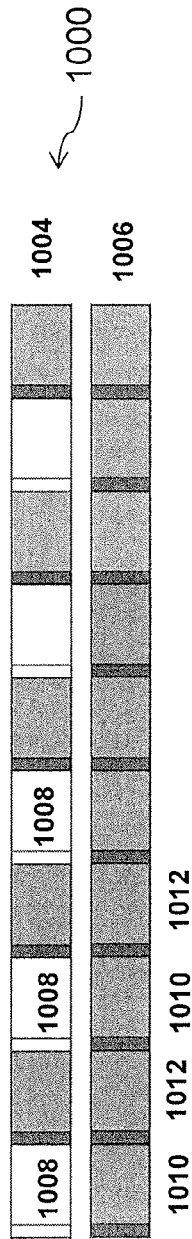
FIG. 10 is a schematic diagram of example low interference downlink subframes for macro and pico cells in an inter-cell interference coordination scenario, according to certain embodiments.

FIG. 10 is a schematic diagram of exemplary low interference downlink control signals 1000 for macro and pico cells in an inter-cell interference coordination scenario, according to certain embodiments. Specifically, first signal 1004 depicts an example control signal for a macro cell, such as macro cell 906 of FIG. 9. A second signal 1006 depicts an example control signal for a pico cell, such as pico cell 902.

In certain embodiments, macro radio network node 914 may provide ICIC across the layers illustrated in FIG. 9. For example, macro radio network node 914 may avoid scheduling unicast traffic in certain subframes. Doing so implies that neither PDCCHs nor PDSCH occur in those subframes. As such, macro radio network node 914 may create low interference subframes 1008, which can be used to protect wireless devices 110 operating in link imbalance zone 910. The macro radio network node 914, which may include a MeNB in certain embodiments, indicates via the backhaul interface X2 to the pico radio network node, which may include a PeNB in certain embodiments. Specifically, macro radio network node 914 may identify which low interference subframes 1008 it will avoid scheduling wireless devices 110 within. Pico radio network node 912 may use this information when scheduling wireless devices 110 operating within link imbalance zone 910. For example, wireless devices 110 within link imbalance zone 910 may be scheduled in subframes 1010 aligned with the low interference subframes 1008 at the macro layer. As a result, the pico layer subframes 1010 may be protected.

In still other embodiments, wireless devices 110 operating within link imbalance zone 910 may be scheduled in all subframes, i.e. in both protected subframes 101 and non-protected subframes 1012. Data transmission in different layers could also be separated in the frequency domain by ensuring that scheduling decisions in the two cell layers are non-overlapping in the frequency domain. For example, messages may be exchanged to coordinate data transmissions between the different radio network nodes. However, such coordination may not be possible for control signaling that conforms to the LTE specifications, requiring control signals to span full bandwidth. As such, for control signaling, a time-domain approach must be used instead.

In certain embodiments, multi-antenna techniques may significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques may be referred to as MIMO. The LTE standard is currently evolving with enhanced MIMO support. A core component in LTE is the support of MIMO antenna deployments and MIMO related techniques. Currently, LTE supports up to 8-layer spatial multiplexing for 8 transmit antennas with possibly channel dependent precoding. The spatial multiplexing mode is aimed for high data rates in favorable channel conditions.

Figure 11:
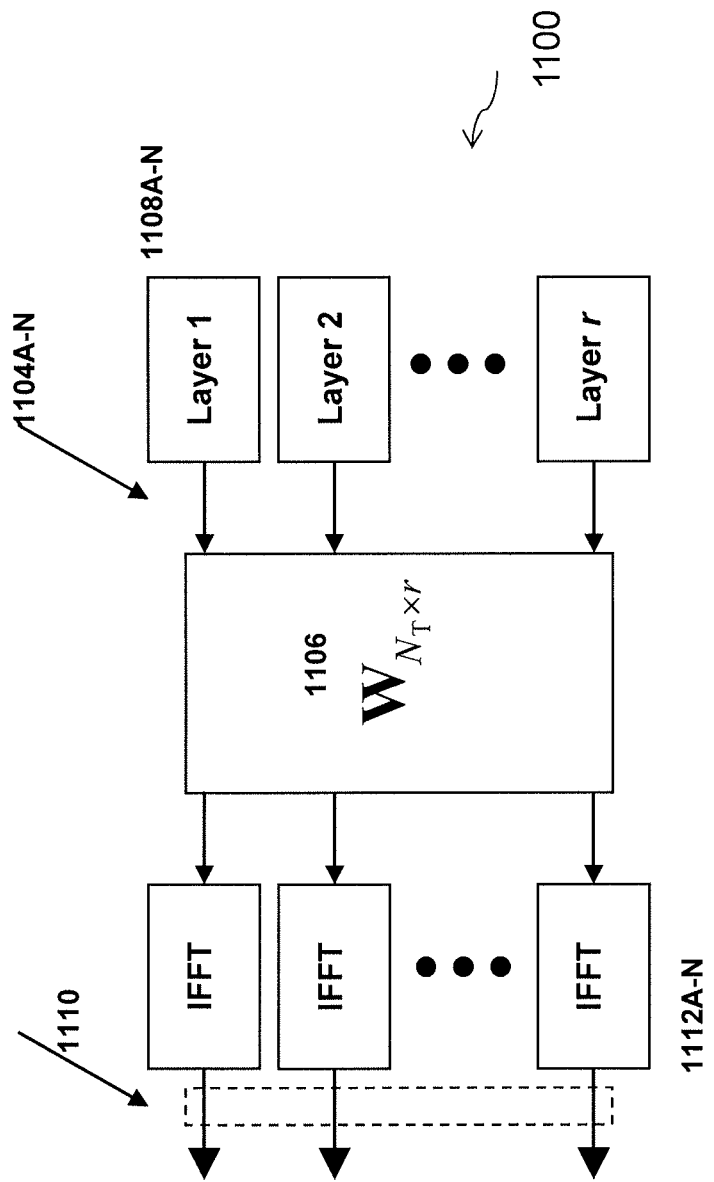
FIG. 11 is a schematic block diagram of an example transmission structure of precoded spatial multiplexing mode in LTE, according to certain embodiments.

FIG. 11 is a schematic block diagram of an example transmission structure 1100 of precoded spatial multiplexing mode in LTE, according to certain embodiments. As depicted, data 1104A-N carrying symbol vectors may be received by a precoder 1106 from layers 1108A-N. Precoder 1106 operates to multiply data 1104A-N by an $N_T \times r$ precoder matrix $W_{N_T \times r}$, which serves to distribute the transmit energy in a subspace of the $N_T$ (corresponding to $N_T$ antenna ports 1110) dimensional vector space via a corresponding number of inverse fast Fourier transformers 1112A-N.

The precoder matrix may be selected from a codebook of possible precoder matrices, and typically indicated by means of a precoder matrix indicator (PMI), which specifies a unique precoder matrix in the codebook for a given number of symbol streams. For example, if the precoder matrix is confined to have orthonormal columns, then the design of the codebook of precoder matrices corresponds to a Grassmanian subspace packing problem. The r symbols in s each correspond to a layer and r is referred to as the transmission rank. In this way, spatial multiplexing is achieved since multiple symbols can be transmitted simultaneously over the same time/frequency resource element (TFRE). The number of symbols r may be adapted to suit the current channel properties.

In an LTE specific embodiment, orthogonal frequency division multiplexing (OFDM may be used in the downlink while discrete Fourier transform precoded OFDM may be used in the uplink. As such, the received $N_R \times 1$ vector $y_n$ for a certain TFRE on subcarrier n (or alternatively data TFRE number n) may be modeled by $$y_n = H_n W_{N_T \times r} s_n + e_n$$

where $e_n$ is a noise/interference vector obtained as realizations of a random process. The precoder, $W_{N_T \times r}$ may be a wideband precoder that may be constant over frequency or frequency selective, in particular embodiments.

In certain embodiments, precoder 1106 may use a precoder matrix that is chosen to match the characteristics of the $N_R \times N_T$ MIMO channel matrix H, resulting in so-called channel dependent precoding. This may be referred to as closed-loop precoding. An objective of closed-loop precoding is the focusing of energy into a subspace that is strong such that much of the transmitted energy is conveyed to wireless device 110. In addition, the precoder matrix may also be selected to strive for orthogonalizing the channel. Thus, after proper linear equalization at wireless device 110, the inter-layer interference may be reduced.

In closed-loop precoding for the LTE downlink, a wireless device 110 transmits, based on channel measurements in the forward link (downlink), recommendations to the radio network node 115 of a suitable precoder to use. Radio network node 115 may choose to use the so recommended precoders or decide to use other precoders, in certain alternative embodiments. While the reporting from wireless device 110 may be constrained to a codebook, the transmission from radio network node 115 may or may not be constrained to a codebook. The former case corresponds to so-called codebook based precoding on the transmit side and is usually associated with CRS based data transmissions. The case when the transmissions are not constrained to a precoder codebook may rely on demodulation reference signal (DMRS) based transmissions and may be referred to as non-codebook based precoding.

In a particular embodiment, a single precoder that is supposed to cover a large bandwidth (i.e., wideband precoding) may be fed back. Additional benefits may be achieved where the frequency variations of the channel are matched and fed back as a frequency-selective precoding report, e.g. several precoders, one per subband. This is an example of the more general case of channel state information (CSI) feedback, which also encompasses feeding back other entities than precoders to assist radio network node 115 in subsequent transmissions to wireless device 110. Such other information may include channel quality indicators (CQIs) as well as transmission rank indicator (RI). For the LTE uplink, the use of closed-loop precoding means radio network node 115 selects precoder(s) and transmission rank and thereafter signals the selected precoder that the wireless device 110 is supposed to use.

In certain embodiments, Space-Frequency Block Coding (SFBC) may be adopted as the scheme used for transmit diversity in an LTE specific network. SFBC uses the Alamouti code to spread the information over the antenna ports as well in the frequency domain. But SFBC in general includes also a whole class of orthogonal space-frequency (space-time) block codes.

For two antenna ports, SFBC takes two symbols $s_k$ and $s_k+1$ at a time as input and distributes these symbols over frequency and space as described by the codeword matrix $$\begin{bmatrix} s_k & s_{k+1} \\ s_{k+1}^c & -s_k^c \end{bmatrix}$$

where the rows correspond to the different antenna ports whereas the columns correspond to the subcarrier dimension and $()^c$ denotes complex conjugate. Typically two consecutive subcarriers are chosen and may be assumed in the sequel. However, this is just one example of an Alamouti based SFBC matrix. Other example matrices may be used. For example, the matrix may be transposed and conjugated in various ways, as well as precoded with a unitary matrix and the result would still be an equivalent Alamouti based SFBC codeword. Even if such transformed SFBC is used, corresponding similar results as those described herein may be obtained. In one example including four antenna ports, SFBC is transmitted at two antenna ports at a time and the two ports switch from one subcarrier to another (frequency switched transmit diversity, FSTD).

A closely related alternative to SFBC is Space-Time Block Coding (STBC). The frequency dimension is then replaced by the time dimension and in LTE the time dimension would likely correspond to consecutive OFDM symbols. It should also be noted that the concept of SFBC (STBC) can be generalized to more than two transmit antennas and that combinations of SFBC (STBC) and other techniques such as Frequency Switched Transmit Diversity (FSTD) or Cyclic Delay Diversity (CDD) may also be used for larger transmit antenna arrays.

For illustrative purposes, consider a 2 transmit antenna port setup and considering two received vectors corresponding to two consecutive subcarriers. This gives the received matrix $$Y = \begin{bmatrix} y_k & y_{k+1} \end{bmatrix} = H \begin{bmatrix} s_k & s_{k+1} \\ s_{k+1}^c & -s_k^c \end{bmatrix} + \begin{bmatrix} e_k & e_{k+1} \end{bmatrix}$$

where it has been assumed that the channel remains constant over the two relevant subcarriers. In certain embodiments, codewords and codewords to layer mapping may be used.

Wireless communication systems targeted for packet based communication may include hybrid ARQ (HARQ) functionality on the physical layer to achieve robustness against the impairments of the radio channel. LTE and WCDMA are two examples of systems in which such functionality is available. The basic idea behind HARQ is to combine forward error correction (FEC) with ARQ by encoding the information containing data block and then adding error-detection information such as cyclic redundancy check (CRC). After reception of the coded data block, it may be decoded and the error-detection mechanism may be used to check whether the decoding was successful or not. If the data block was received without error, an ACK is sent to the transmitter indicating successful transmission of the data block and that the receiver is ready for a new data block. On the other hand, if the data block was not decoded correctly, a NACK may be sent. The NACK indicates that the receiver expects a retransmission of the same data block. Subsequent to the reception of the retransmission, the receiver may choose to either decode it independently or utilize some or all previous receptions of the same data block in the decoding process.

In certain embodiments, the encoded bits originating from the same block of information bits may be referred to as a codeword. This may also be the terminology used in LTE to describe the output from a single HARQ process serving a particular transport block and comprises turbo encoding, rate matching, interleaving etc. The codewords may then be modulated and distributed over the antennas. The first (modulated) codeword may for instance be mapped to the first two antennas and the second codeword to the two remaining antennas in a four transmit antenna system.

Figure 12:
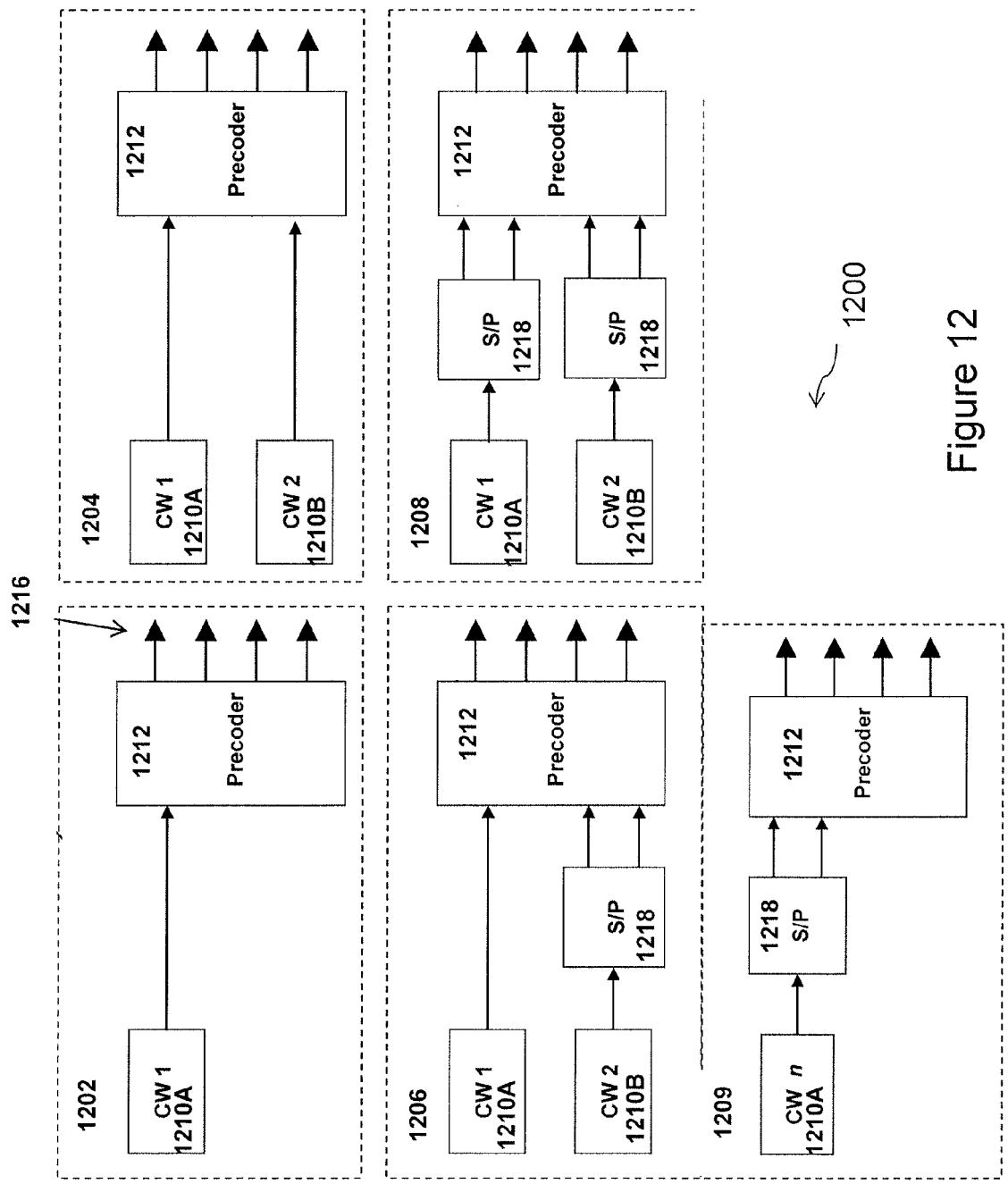
FIG. 12 is a schematic block diagram of an example codeword-to-layer mapping for a four antenna system with precoding, according to certain embodiments.

FIG. 12 depicts an example codeword mapping 1200, according to certain embodiments. As depicted, mapping 1200, includes five antenna rankings 1202, 1204, 1206, 1208, and 1209. Each antenna ranking includes at least one codeword 1210A being received by a precoder 1212 for output to one or more antennas 1216. Antenna rankings 1204, 1206, and 1208 also show codeword data 1210B being received by precoder.

In certain embodiments, precoding may be used in conjunction with multi-antenna transmission to mix and distribute the modulation symbols over the antenna while possibly taking the current channel conditions into account. This may be realized by multiplying the information carrying symbol vector by a matrix selected to match the channel. The symbol vector would contain modulation symbols from potentially all the codewords and the codewords thus map to a sequence of symbol vectors. These sequences form a set of parallel symbol streams and each such symbol stream is referred to as a layer. Thus, depending on the precoder choice, a layer may directly correspond to a certain antenna or it may via the precoder mapping be distributed onto several antennas.

In a multi-antenna system (often referred to as a MIMO system), data may be transmitted from several HARQ processes at once, in certain embodiments. This may also be known as multi-codeword transmission. Depending on the channel conditions, this can substantially increase the data rates since in favorable conditions the channel can roughly support as many codewords as the minimum of the number of transmit and receive antennas.

One of the most important characteristics of the channel conditions in the field of high rate multi-antenna transmission is the so-called channel rank. Roughly speaking, the channel rank can vary from one to the minimum number of transmit and receive antennas. Consider a 4×2 system as an example. A 4×2 system includes four transmit antennas and two receive antennas. In such a system, the maximum channel rank is two. The channel rank varies in time as the fast fading alters the channel coefficients. Moreover, channel rank determines how many layers, and ultimately also codewords, may be successfully transmitted simultaneously. Hence, if the channel rank is one at the instant of transmission of two codewords mapping to two separate layers, there is a strong likelihood that the two signals corresponding to the codewords will interfere causing both of the codewords to be erroneously detected at the receiver.

In conjunction with precoding, adapting the transmission to the channel rank may involve using as many layers as the channel rank. In the simplest of cases, each layer may correspond to a particular antenna. The issue then arises of how to map the codewords to the layers. Taking the 4 transmit antenna case in LTE as an example, the maximum number of codewords is limited to two while up to four layers can be transmitted. In certain embodiments, a fixed rank depending mapping, such as mapping 1200 depicted in FIG. 12 may be used.

In general, CoMP transmission and reception refers to a system where the transmission and/or reception at multiple, geographically separated antenna sites is coordinated in order to improve system performance. More specifically, CoMP refers to coordination of antenna arrays that have different geographical coverage areas and/or coverage areas that are covered in different ways. As discussed herein, an antenna covering a certain geographical area in a certain manner may be referred to as a point or, more specifically, a transmission point (TP). The coordination may be distributed by means of direct communication between the different sites or by means of a central coordinating node.

CoMP is a tool introduced in LTE to improve the coverage of high data rates, the cell-edge throughput and/or to increase system throughput. In particular, the goal is to distribute the user perceived performance more evenly in the network by taking control of the interference in the system, either by reducing the interference and/or by better prediction of the interference. CoMP operation targets many different deployments, including coordination between sites and sectors in cellular macro deployments, as well as different configurations of Heterogeneous deployments, where for instance a macro node coordinates the transmission with pico nodes within the macro coverage area.

There are many different CoMP transmission schemes that may be used. Some example CoMP transmission schemes include:

Dynamic Point Blanking includes multiple transmission points and the coordination of a transmission so that neighboring transmission points may mute the transmissions on the time-frequency resources (TFREs) that are allocated to wireless devices that experience significant interference.

Dynamic Point Selection allows the data transmission to a wireless device 110 to switch dynamically (in time and frequency) between different transmission points, so that the transmission points are fully utilized.

Coordinated Beamforming requires the transmission points to coordinate the transmissions in the spatial domain by beamforming the transmission power in such a way that the interference to wireless devices served by neighboring transmission points are suppressed.

Joint Transmission results in the signal to a wireless device 110 being simultaneously transmitted from multiple transmission points on the same time/frequency resource. The aim of joint transmission is to increase the received signal power and/or reduce the received interference if the cooperating transmission points otherwise would serve some other wireless devices 110 without taking the join transmission devices into consideration.

The concept of a point may be in conjunction with techniques for coordinated multipoint (CoMP). In this context, a point corresponds to a set of antennas covering essentially the same geographical area in a similar manner. Thus, a point may correspond to one of the sectors at a site, but it may also correspond to a site having one or more antennas all intending to cover a similar geographical area. Often, different points represent different sites. Antennas correspond to different points when they are sufficiently geographically separated and/or having antenna diagrams pointing in sufficiently different directions. Techniques for CoMP may entail introducing dependencies in the scheduling or transmission/reception among different points, in contrast to conventional cellular systems where a point from a scheduling point of view is operated more or less independently from the other points. DL CoMP operations may include, e.g., serving a certain wireless device 110 from multiple points, either at different time instances or for a given subframe, on overlapping or not overlapping parts of the spectrum. Dynamic switching between transmission points serving a certain wireless device 110 is often termed as DPS (dynamic point selection). Simultaneously serving a wireless device 110 from multiple points on overlapping resources is often termed as JT (joint transmission). The point selection may be based, e.g., on instantaneous conditions of the channels, interference or traffic. CoMP operations are intended to be performed, e.g., for data (PDSCH) channels and/or control channels such as ePDCCH.

In certain embodiments, CoMP feedback may be provided. A common denominator for the CoMP transmission schemes is that the network needs CSI information not only for the serving TP, but also for the channels linking the neighboring TPs to a wireless device 110. By, for example, configuring a unique CSI-RS resource per TP, a wireless device may resolve the effective channels for each TRANSMISSION POINT by measurements on the corresponding CSI-RS. It may be recognized that a CSI-RS resource may be loosely described as the pattern of resource elements on which a particular CSI-RS configuration is transmitted. A CSI-RS may be determined by a combination of "resoureConfig," "subrameConfig," and "antennaPortsCOunt," which are configured by RRC signaling. The effective channels for each transmission point may be resolved by mapping the physical antennas in the same way as the reference symbols used for the CSI channel measurement.

CoMP feedback builds upon per CSI-RS resource feedback which corresponds to separate reporting of channel state information (CSI) for each of a set of CSI-RS resources. Such a CSI report may, in certain example embodiments, correspond to a Precoder Matrix Indicator (PMI), Rank Indicator (RI), and/or Channel Quality Indicator (CQI), which represent a recommended configuration for a hypothetical downlink transmission over the same antennas used for the associated CSI-RS (or as the RS used for the channel measurement). More generally, the recommended transmission may be mapped to physical antennas in the same way as the reference symbols used for the CSI channel measurement. In a particular embodiment, there could be interdependencies between the CSI reports. For example, they could be constrained to have the same RI, so-called rank inheritance. Typically there may be a one-to-one mapping between a CSI-RS and a transmission point, in which case per CSI-RS resource feedback corresponds to per-transmission point feedback. As such, a separate PMI/RI/

CQI is reported for each transmission point. The considered CSI-RS resources are configured by the eNodeB as the CoMP Measurement Set.

For efficient CoMP operation, it may be equally important to capture appropriate interference assumptions when determining the CQIs as it is to capture the appropriate received desired signal. In uncoordinated systems, wireless device 110 can effectively measure the interference observed from all other TPs (or all other cells), which will be the relevant interference level in an upcoming data transmission. Such interference measurements are typically performed by analyzing the residual interference on CRS resources after the wireless device 110 subtracts the impact of the CRS signal.

In coordinated systems performing CoMP, such interference measurements becomes increasingly irrelevant. Most notably, within a coordination cluster a radio network node 115 comprising an eNodeB may, to a large extent, control which TPs that interfere with a wireless device 110 in any particular time-frequency resource element (TFRE). Hence, there may be multiple interference hypotheses depending on which TPs are transmitting data to other terminals.

For the purpose of improved interference measurements, the network can configure a wireless device to measure interference on a particular Interference Measurement Resource (IMR) that identifies a particular set of resource elements in the time and frequency grid that is to be used for a corresponding interference measurement. An alternative name of IMR used in LTE specifications is CSI-IM. The network may thus control the interference seen on an IMR, by for example muting all TPs within a coordination cluster on the IMR, in which case the wireless device 110 will effectively measure the inter CoMP cluster interference. Moreover, it is essential that a radio network node 115 accurately evaluates the performance of wireless device 110 given different CoMP transmission hypotheses—otherwise the dynamic coordination may be meaningless. Thus, the system may be configured to track/estimate also different intra-cluster interference levels corresponding to different transmission and blanking hypotheses.

One fundamental property of DL CoMP is the possibility to transmit different signals and/or channels from different geographical locations (points). One of the principles guiding the design of the LTE system is transparency of the network to the wireless device 110. In other words, wireless device 110 is able to demodulate and decode its intended channels without specific knowledge of scheduling assignments for other wireless devices 110 or network deployments.

Channel estimation based on reference signals (RS) often makes use of assumptions regarding similarity of the channels over which different RS (where each RS typically corresponds to a logical entity called antenna port) is transmitted. Such assumptions of similar channel properties between different antenna ports are referred to as antenna port quasi co-location assumptions. The overall co-location assumptions a wireless device makes for a certain channel type (e.g. for PDSCH, or for ePDCCH) are collected into a co-location wireless device behavior, or "behavior" for short. The "quasi" part of quasi-co-location refers to the fact that co-location does not necessarily imply physical colocation of the antenna ports associated to the channels, but rather colocation with respect to the listed channel and signal properties.

Even though in general the channel from each antenna port to each wireless device 110 receive port may be substantially unique, some statistical properties and propagation parameters may be common or similar among different antenna port, depending on whether the different antenna ports originate from the same point or not. Such properties include, e.g., the received power level for each port, the delay spread, the Doppler spread, the received timing (i.e., the timing of the first significant channel tap) and the frequency shift.

Typically, channel estimation algorithms perform a three step operation. A first step consists of the estimation of some of the statistical properties of the channel. A second step consists of generating an estimation filter based on such parameters. A third step consists of applying the estimation filter to the received signal in order to obtain channel estimates. The filter may be equivalently applied in the time or frequency domain. Some channel estimator implementations may not be explicitly based on the three steps method described above, but still exploit the same principles.

Accurate estimation of the filter parameters in the first step may lead to improved channel estimation. Even though it is often in principle possible for wireless device 110 to obtain such filter parameters from observation of the channel over a single subframe and for one RS port, it is usually possible for the wireless device 110 to improve the filter parameters estimation accuracy by combining measurements associated with different antenna ports (i.e., different RS transmissions) sharing similar statistical properties. Furthermore, the channel estimation accuracy may be improved by combining RSs associated to multiple physical resource blocks.

The Network may be aware of which RS ports are associated with channels with similar properties, based on its knowledge how antenna ports are mapped to physical points. However, wireless device 110 is not typically aware of such information because of the transparency principle of network transmission. Accordingly, antenna port quasi-co-location assumptions may be introduced in the LTE specifications to establish which antenna ports a wireless device 110 may assume to have similar properties and what those properties are. For example, in certain embodiments, the new transmission mode 10 introduced in Rel-11 supports dynamic signaling of quasi-co-location information using a DCI format transmitted on a DL control channel (like PDCCH or ePDCCH). For example, DCI format 2D associated with transmission mode 10 may be used for signaling that DMRS for PDSCH and is co-located with a specific CSI-RS resource and a specific CRS. Basically a message state in the DCI format may provide an index into a configurable table of CSI-RS resources used for defining the meaning of the message state.

In certain embodiments, the same message state may also be used to signal information on how to map the PDSCH onto the resource element grid, including what OFDM symbol to start the PDSCH on, which REs corresponding to a CRS to map around, what MBSFN configuration to assume, and/or what ZP CSI-RS configuration to assume. The RRC configurable table defining the meaning of each associated message is popularly referred to as the PQI table, where PQI stands for PDSCH mapping and quasi-co-location information. Correspondingly, the message state itself may be referred to as a PQI indicator.

Figure 13:
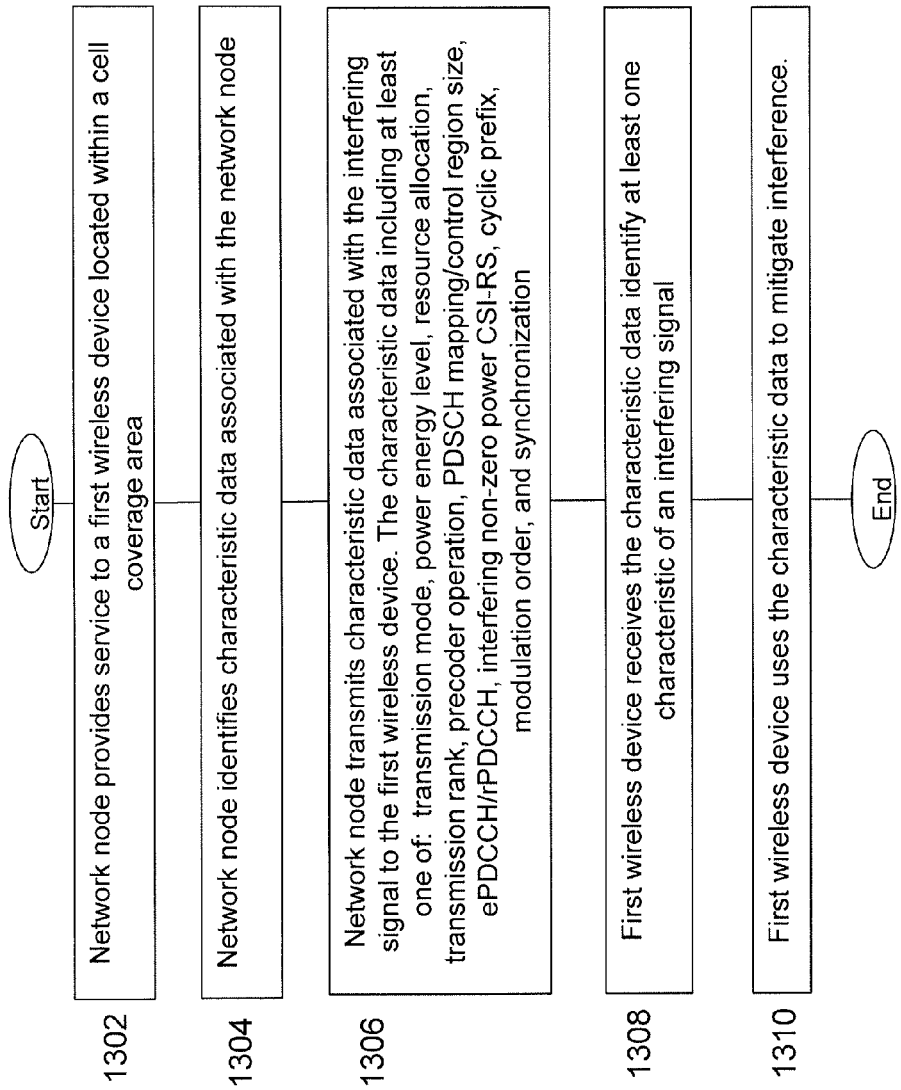
FIG. 13 is a flow diagram illustrating a method for providing and receiving characterization data for the purposes of interference mitigation, according to certain embodiments.

As described above, the process of interference cancellation may be greatly improved and/or made more efficient where network node 115 provides characterization data associated with one or more interfering signals to a wireless device 110. FIG. 13 illustrates a method performed by a network node, such as network node 206 depicted in FIG. 9, for providing signaling to a first wireless device 110A for use in the performance of interference cancellation or mitigation, according to certain embodiments. In general, the characterization data that is signaled may inform wireless device 110A about certain characteristics of the interference. Additionally or alternatively, the signaling may inform wireless device 110A of certain characteristics that the interference does not have. The method described herein reduces the need for blind and potentially erroneous estimation on by wireless device of the characteristics of the interference.

The method begins at step 1302 with the network node 206A providing telecommunications services for a first wireless device located within a cell coverage area associated with the network node. At step 1304, network node 206A identifies characteristic data associated with at least one characteristic of an interfering signal associated with a second wireless device 110B. Though the at least one characteristic may be specific to an interfering signal, in some embodiments, it is also recognized that the at least one characteristic may be associated with a plurality of interference signals. In a particular embodiment, the at least one characteristic may be applied to all interference signals associated with a cell identifier of a cell 204B.

In certain embodiments, the at least one characteristic may be tied to a cell identifier of a neighboring cell 204B that is outside the cell coverage area 204A associated with the network node 206A. Thus, the second wireless device 110B may be located in a cell that neighbors the cell of first wireless device 110A. In a heterogeneous network, for example, the cell identifier may be of a pico cell that neighbors the cell of first wireless device 110. According to a particular embodiment, the at least one characteristic may include a plurality of characteristics associated with a plurality of interference signals tied to the cell identifier of the neighboring pico cell.

At step 1306, network node 206A transmits the characteristic data associated with the interfering signal to the first wireless device 110A. In certain embodiments, the transmission of the characteristic data may be by signaling that is conveyed using higher layer signaling such as RRC or MAC header elements. In other embodiments, it may be conveyed dynamically using for example DL control channels such as PDCCH/ePDCCH. Though the characteristic data may be transmitted to first wireless device 110A via dedicated signal addressed only to first wireless device 110A in a particular embodiment, it is recognized that the characteristic data may be broadcasted to multiple wireless devices at once.

Though the provided example includes that the transmission is from network node 206A to a first wireless device 110A, the information could be signaled between network node 208 and wireless device 110A, directly. It is further recognized that the information content could be signaled between two or more network nodes such as network node 206A and 206B or network node 208 and network node 206A. Such inter-node signaling could be performed on a standardized protocol such as X2 or in a proprietary manner, in certain embodiments. Thus, if first wireless device 110A receives signaling from radio network node 206A involving characteristics of interfering transmissions stemming from other nodes, a related information exchange may occur between the radio network node that is sending the information to first wireless device 110A and those other radio network nodes. Alternatively, the signaling may be transmitted directly over the air from each radio network node 206B relevant from an interference perspective for first wireless device 110A. Such inter-node signaling may also be consistent with the present disclosure.

The characteristic data transmitted by the radio network node 206A to first wireless device 110A may include any information that may be used by first wireless device 110A for the cancellation and/or mitigation of the interference signal. In general, the transmitted characteristic data may inform first wireless device 110A about certain characteristics that the interfering signal may have or may not have. In certain embodiments, the characteristic data may include any one or combination of the following types of data:

Transmission Mode Information of Interference

In certain embodiments, the characteristic data may relate to transmission mode data for the interfering signal of a cell 204A associated with first wireless device 206A or neighboring cell 204B.

There are currently ten different transmission modes (TMs) in release 11 of 3gpp LTE (TM 1-10) and more transmission modes may be anticipated in future releases. In certain embodiments, the characteristic data provided by radio network node 206A may identify which transmission mode or modes first wireless device 110A may assume that a neighboring cell is using. Specifically, the characteristic data may identify transmission modes associated with one or more interfering signals associated with a neighboring cell. In a particular embodiment, the characteristic data may convey one or more transmission modes that are in use. For example, in the simplest of cases, the characteristic data may identify a single transmission mode that may be commonly used over the network, or at least in one or more neighboring cells. Thus, radio network node 206A may transit a single TM value between TM1 and TM10 for each cell that neighbors first wireless device 110A. In certain other embodiments, radio network node 206A may transmit a single TM value and coordinate the transmission mode between the neighboring cells. In such an embodiment, first wireless device 110A may assume the same TM is used in all cells. In still other embodiments, radio network node 206A may transmit multiple signals and each signal may indicate whether device-specific reference symbols (RS) or cell-specific RS transmission modes are used in each neighboring cell. For example, in a particular embodiment, one or more messages may identify a subset of TMS, such as, for example, TM1, TM2, TM3, TM4, TM6, TM8, TM9, and TM10 for a neighboring cell. In any of these embodiments, first wireless device 110A may be able to detect the exact TM used by the network for each neighboring cell.

In certain embodiments, the characteristic data may include a parameter representing the number of antenna ports associated with a cell-specific reference signal used by the signaled neighboring cell. For example, a parameter of n1 may identify that one antenna port is associated with the cell-specific reference signal of a neighboring cell. Likewise, n2 might identify that two antenna ports are associated with the cell-specific reference signal of the neighboring cell.

In a particular embodiment, the signaling of a transmission mode may include 1 bit or at least some code points that identify whether the transmission mode is DM-RS or CRS based. Where multiple TMs are identified, the signaling may include a bit or code for each TM. Additionally or alternatively, the characteristic data may identify what type of DMRS pattern is used. For example, in a particular embodiment, the characteristic data may identify whether the DMRS pattern is that associated with TM7 or TM8-10. In still other embodiments, the characteristic data may include transmission mode data that is specific for a certain number of antenna ports. For example, in a particular embodiment, the characteristic data may correspond to TM3 with 2 antenna ports, or TM3 with 4 antenna ports. Such characteristic data allows first wireless device 110A to distinguish between 2 and 4 ports which may be helpful to first wireless device 110A since the 2 antenna port case with TM3 may be more common than TM3 with 4 antenna ports.

In particular embodiments, providing characteristic data that identifies the transmission mode may help first wireless device 110A to determine whether DM-RS or CRS based transmissions have been used. Transmission mode data may also enable the first wireless device 110A to determine whether first wireless device 110A should assume transmit diversity or closed-loop precoding and, thereby, reduce the amount of blind hypothesis testing in first wireless device 110A. Accordingly, while it is recognized that first wireless device 110A may blindly estimate the transmission mode where necessary, characteristic data that provides transmission mode data may reduce computational requirements on first wireless device 110A. Even where the characteristic data identifies multiple transmission modes that may be applicable to an interfering signal, computational efforts by first wireless device 110A are reduced.

Though the characteristic data may include data identifying one or more transmission modes that may be in use, it is also recognized that the characteristic data may include data identifying one or more transmission modes that are not in use. Providing such data to first wireless device 110A reduces the search space in which first wireless device must search when performing blind detection of characteristic data for interfering signals. Thus, first wireless device 110A may use the data to then detect the transmission mode used by the network for each neighboring cell according to the restricted set. Providing such data may also have the effect of limiting the computation complexity required by first wireless device 110A and may increase the reliability of the detection process. The transmission of such data may be similar to that provided above.

Power/Energy Levels of Interference

In certain embodiments, the characteristic data may relate to the power or energy level of the interfering signal of a cell 204A associated with first wireless device 206A or neighboring cell 204B.

Interference cancellation techniques typically rely on knowledge of the channel over which the interfering symbols are transmitted in order to correctly estimate the impact of interference on the received signals. In certain embodiments, the characteristic data may include a first parameter, $P_A$ that indicates a restricted subset of power offset for the associated cell or neighboring cell. For example, the restricted subset of power offset may be for QPSK, 16QAM, and 64QAM PDSCH transmissions for the associated cell or neighboring cell. The restricted subset may be set by the network and values may be selected from a preselected group of values. For example, in a specific embodiment, the power offset values may be selected from the values −12, −9, −6, −4.77, −3, −1.77, 0, 1, 2, and 3 in a particular embodiment where −12 and −9 are only applicable to QPSK. In certain embodiments, the characterization data may include a maximum number of power offset values in a restricted subset. For example, in certain embodiments the maximum number of power offset values may be 3. In certain embodiments, In certain embodiments, the channel may at least partly be obtained from the reference signals associated with the interfering signal of interest. Device-specific RS may be transmitted in the same manner as the corresponding data so in that the complete channel may be determined from the RS. However, this may not be the case when the interfering signal is associated to CRS since the channel over which the data symbols are transmitted may be scaled differently than the channel seen by CRS. Equivalently, the power/energy of the transmitted data symbols may differ from the power/energy of the transmitted symbols corresponding to CRS. Accordingly, in certain embodiments, characteristic data may include a second parameter PB that for a PDSCH of interest. For example, characteristic data may include a value of dB-6 to correspond to −6 dB, in one particular embodiment. Additionally or alternatively a value dB-4dot77 may correspond to −4.77 dB, in a particular embodiment.

In particular embodiments, first wireless device 110 may determine the scaling factor between the channel $\hat{H}_{CRS}$ estimated from CRS and the channel $\hat{H}_{data}$ used for data demodulation of interfering signals. To avoid completely blind estimation of the scaling factor, network node 206A may send characteristic data that may be used to determine the scaling factor or at least assist in determining it. For example, in certain embodiments, network node 206A may send a message providing first wireless device 110A with the transmit power/energy ratio between data and CRS. Such parameter signaling already exists for the PDSCH of interest for first wireless device 110A.

The existing parameters are signaled by means of RRC and referred to as $P_A$ and $P_B$. The former parameter involves the ratio with respect to data symbols in OFDM symbols that do not carry CRS while the latter parameter determines the energy ratio between data symbols in OFDM symbols carrying CRS and data symbols in OFDM symbols not carrying CRS.

However, such parameter signaling is not currently available for interfering signals but could be reused for describing characteristics of interfering signals as well. Accordingly, in certain embodiments, the above-described signaling may be explicit in terms of the actual scaling factors between the CRS based channel and the channel for data demodulation. In contrast to the above-described signaling, particular embodiments may include signaling that covers the case of QPSK modulation. For example, $P_A$ and $P_B$ for the PDSCH of interest may cover QPSK modulation so that first wireless device 110A may determine or appreciate the power balance between the different received signals.

In certain embodiments, power ratios may change continuously. In order to limit the signaling overhead, network node 206A may inform first wireless device 110A that the same power/energy level signaling (e.g. $P_A$ and $P_B$ or equivalent) may be assumed in all the neighboring cells 204B-C and the serving cell 204A, in a particular embodiment. In alternative embodiments, the power/energy level signaling may distinguish between interfering signals and the serving cell. In certain embodiments, the characteristic data may distinguish between number of antenna ports. Thus, for example, indications for power levels concerning cells with 2 CRS antenna ports could for example be different from indications of power levels for cells with 4 CRS antenna ports. In certain other embodiments, network node 206A may be restricted to slowly changing power level related parameters. For example, a set of $P_A$ and $P_B$ may be signaled per cell 204 with a certain reporting ratio every x subframes.

Resource Allocation Information for Interference

In certain embodiments, the characterization data may include data relating to resource allocation for the interfering signal of a cell 204A associated with first wireless device 206A or neighboring cell 204B.

LTE provides great flexibility when it comes to scheduling. Transport blocks can be mapped to resources on a granularity as fine as a single resource block pair. In addition, the very notion of a resource block pair also carries some flexibility. This is true since the two resource blocks in a resource block pair may not necessarily span the same subcarriers due to the support of both distributed and localized virtual resource blocks. This flexibility may make it harder for first wireless device 110A to reliably estimate parameters since the interfering signals are at most guaranteed to be stationary a single resource block pair.

To mitigate this issue, network node 206A may inform first wireless device 110A on the granularity of scheduling, in certain embodiments. Additionally, network node 206A may inform first wireless device 110A as to whether distributed or localized virtual resource blocks are used for interfering transmissions to other wireless devices 110 on the same time/frequency resource (e.g. in other cells or in the same cell but for transmission on the same time-frequency resources as used by first wireless device 110A, as in a MU-MIMO/shared-cell).

In certain embodiments, signaling resource granularity in the frequency domain may include informing first wireless device 110A of one or more possible sets of resource blocks other interfering wireless devices 110B may be assumed to be scheduled with.

In one particular embodiment, the system bandwidth could be divided into sets of frequency consecutive resource blocks. Network node 206A may inform first wireless device 110A that it may assume interference is scheduled on an integer number of such sets. For example, where there are 100 resource blocks over frequency for a 20 MHz LTE system, consecutive resource blocks could be grouped into sets of four and four. First wireless device 110A could be informed that interference may be assumed to be scheduled on such a group level. This may resemble typical operation of LTE using Resource Allocation Type 0 in the downlink assignment where a bitmap informs first wireless device 110A to which resource block group (RBG) the PDSCH may be mapped.

In other embodiments, the resource blocks may be divided into sets by other Resource Allocation Types such as Type 1 and Type 2. Thus, the signaling message to first wireless device 110A may be heavily compressed by only sending the Resource Allocation Type that first wireless device 110A should assume that interfering transmissions are using. Variations of this signaling scheme include basing the resource grouping on a Resource Allocation Type but modified in a certain manner, for example, by scaling the RBG size. In other embodiments, network node 206A may signal which Resource Allocation Types that wireless device 110A may then assume is not being used. In particular embodiments, the characterization data may be cell specific to give the opportunity for the network to use different Resource Allocation Types in different cells.

In certain embodiments, the characterization data provided to first wireless device 110A may additionally or alternatively include whether interfering transmissions should be assumed to be using localized or distributed virtual resource blocks. This may represents the typical way of operating LTE with both blocks of a resource block pair covering the same subcarriers.

Transmission Rank Information of Interfering Signals

In certain embodiments, the characterization data may identify the transmission rank of interfering signals of a cell 204A associated with first wireless device 206A or neighboring cell 204B.

Currently, LTE supports spatial multiplexing with up to eight layers transmitted to a single wireless device. The number of transmitted layers is often referred to as transmission rank. Most interference cancellation techniques require knowledge of the transmission rank of interfering signals. First wireless device 110A, thus, may benefit from receiving information from network node 206A that identifies the transmission ranks that may be expected from interfering transmissions. As described above, first wireless device 110A may receive the characterization data via RRC, a mac header element, or dynamic signaling such as from PDCCH/ePDCCH. The characterization data may take the form of a range (e.g. 1-2), the maximum rank (e.g. 2) or an 8-bit bitmap where each bit represents one particular rank out of the eight possible, in various embodiments. In still other embodiments, the characterization data may indicate which rank or ranks the interfering signals are not expected to use.

In certain embodiments, rank related characterization data may be specific to each cell (cell-id) or to values of parameter or parameters playing the role of a cell-id. The characterization data may still be wireless device specific. For example, the characterization data may include the RRC configurable parameter used in controlling the initialization of the pseudo-random sequence generator for DM-RS. In other embodiments, the rank related characterization data may be applicable for all cells or all DM-RSs and, thus, applicable to all interfering transmissions. Additionally or alternatively, the rank related characterization data may take into account the number of antenna ports used in different cells or in different CSI-RS resources.

Many wireless devices 110 may not support the maximum transmission rank of eight. In fact, as of this writing commercial wireless devices support a maximum of two layers. Thus, in many cases, characterization data related to rank restriction may not imply any practical restriction on the network since higher rank transmissions are not currently used.

Precoder Operation Information for Interference

In certain embodiments, the characterization data may include precoder operation information of a cell 204A associated with first wireless device 206A or neighboring cell 204B.

Beginning with Rel-12, LTE supports two different precoder codebooks for transmission mode 10 having four transmitters where CSI feedback may be configured for 4 CSI-RS antenna ports. The choice of precoder is an important part of the characteristics of the received interfering signals. Accordingly, in certain embodiments, the characterization data may include information identifying which precoders to expect the interference is using would be useful. In particular, if the interfering signals rely on CRS for demodulation, knowing the possible precoders becomes essential for first wireless device 110A. As such, characterization data may identify the choice of precoder codebook. The characterization data may also include restrictions on which precoders that may be assumed to be used within a codebook. For example, the interference could be assumed to use only a subset of the precoders available within a codebook. In a particular embodiment, the characterization data may be compressed by informing first wireless device 110A that it should assume the same precoder subset for interfering signals as the precoders allowed for CSI feedback reporting transmitted by the first wireless device 110A.

In certain embodiments, characterization information that includes precoder restrictions may also identify that the same precoder is used across all scheduled resource blocks of an interfering signal. Additionally or alternatively, the characterization data may identify a configurable frequency granularity. Such information would relieve first wireless device 110A of the burden of having to estimate the used precoder based only on the received signals from one or a few resource blocks. Additionally or alternatively, such signaling could even be tied to what kind of precoding is used for transmissions intended to first wireless device 110A. For example, the configured CSI feedback mode could influence the assumption for the interfering signals. So, if for example first wireless device 110A is configured with a CSI feedback mode involving a single precoder over the (schedulable) system bandwidth (so-called wideband precoding), first wireless device 110A may assume that wideband precoding also holds for interfering transmissions.

PDSCH Mapping/Control Region Size Information for Interference

In certain embodiments, the characterization data may include data related to PDSCH mapping and/or control region size for a cell 204A associated with first wireless device 206A or neighboring cell 204B.

As described in detail above, it may be recognized that up to the first three or four OFDM symbols in a subframe are devoted to downlink control (PDCCH, PCFFCH, PHICH). Transmit diversity is typically used as transmission scheme with the control region. The characteristics of the downlink control signal are therefore typically widely different from the characteristics of the signals sent on PDSCH. Wireless devices 110 that are equipped for interference cancellation must appropriately deal with the difference in interference characteristics between the control region and the data region to maximize performance.

However, it may be recognized that the control region size may vary from one cell to another. and that wireless device 110A may only have knowledge of its own cell's control region size. Accordingly, in certain embodiments, network node 206A may assist first wireless device 110A in interference cancellation by providing characterization data identifying one or more assumptions that first wireless device 110A may make concerning the control region size of interfering signals. In a particular embodiment, for example, such a message could indicate that the control region size is either 0, 1, 2, 3, or 4 OFDM symbols. Additionally or alternatively, the characterization data may include a code point informing first wireless device 110A that it should assume that the control region for the interfering signal is the same control region as for the serving cell. Alternatively, the characterization data may provide starting a OFDM symbol for interfering PDSCH transmissions rather than control region size. In general, information of how the PDSCH is mapped onto the resource grid may be useful for first wireless device 110A and worthwhile for inclusion in the characterization data provided by network node 206A. This may include not only OFDM starting symbol but also the resource elements that are skipped because the resource elements contain reference signals such as CRS (which can be frequency shifted depending on cell-ID), non-zero power or zero power CSI-RS, and positioning reference signal.

In alternative embodiments, the characterization data may identify properties that the interfering signals do not have. For example, the characterization data may indicate which control region sizes should not be expected and/or which OFDM starting symbols for PDSCH not to expect.

ePDCCH/rPDCCH Information for Interference

In certain embodiments, the characterization data may include ePDCCH/rPDCCH information for a cell 204A associated with first wireless device 206A or neighboring cell 204B.

LTE supports an alternative DL control channel called ePDCCH. The ePDCCH may be transmitted in the data region using DM-RS and may interfere with a PDSCH intended for first wireless device 110A. However, performing cancellation of interfering ePDCCH is substantially different from performing cancellation of PDSCH. For example, performing cancellation of interfering ePDCCH may require additional blind hypothesis testing on part of first wireless device 110A unless the network provides assistance signaling. In particular embodiments, such assistance signaling may include characterization data comprising information identifying which resource blocks the interfering ePDCCH may potentially be scheduled on. Providing such characterization data may relieve first wireless device 110A of the burden of performing unnecessary hypothesis testing.

In certain embodiments, the characterization data my point out the resource blocks explicitly in a manner similar to that used to inform first wireless device 110 of its own ePDCCH. In other embodiments, the characterization data may implicitly identify the resource blocks by indicating that first wireless device 110A should assume that the resource blocks used for interfering ePDCCH are the same as the resource blocks for its own ePDCCH. In certain embodiments, characterization data related to ePDCCH or rPDCCH may be specific to one or more cells. In other embodiments, the characterization data may be related to all cells. In still other embodiments, the characterization data may indicate which resource blocks are not used for ePDCCH or which resource blocks first wireless device 110A may assume that interference is due to PDSCH. Assistance signaling may provide an indication of whether ePDCCH is used or not for interfering signals and may be formulated in terms of a wireless device assumption. Such data may reduce the amount of blind hypothesis testing required where the ePDCCH is not used in the network.

Though it is described that the characterization data may provide information relating the ePDCCH control channel, it is recognized that the characterization data may relate to the downlink control channel for relays (rPDCCH), in certain embodiments. Assistance signaling similar to that described above is equally applicable to rPDCCH usage.

Non-Zero Power CSI-RS Characteristics

In certain embodiments, the characterization data may include ePDCCH/rPDCCH information for a cell 204A associated with first wireless device 206A or neighboring cell 204B.

In LTE, Non-zero power CSI-RS may be configured using radio resource control (RRC). This represents another source of interference that first wireless device 110A may attempt to mitigate. However, a completely blind approach to estimation may be prohibitively complex and result in subpar performance. Accordingly, it may be beneficial for network node 206A to provide with assistance signaling that informs first wireless device 110A about non-zero power CSI-RS transmission that may potentially cause significant interference. In a particular embodiment, characterization data may indicate which resource elements are occupied by CSI-RS. For example, the characterization data may indicate the subframe offset, period and CSI-RS configuration in a particular embodiment. The characterization data may also indicate the reference signal sequence at least where the reference signal sequence is not determined by the cell id. An indication of reference signal sequence for CSI-RS may include a specification of how the involved pseudo-random sequence generator is initialized, in particular signaling the potentially RRC configurable parameter $N_{ID}^{CSI}$ that corresponds to a cell-id if not otherwise configured by higher layers.

In certain embodiments, characterization data that includes multiple different indications of the above non-zero power CSI-RS related signaling may be supported to provide first wireless device 110A with a good understanding of potentially interfering CSI-RS transmissions.

In other embodiments, characterization data may indicate that first wireless device 110A does not need to be concerned about non-zero power CSI-Rs cancellation. This could be the case if network is not configuring any CSI-RS at all or where the network is configuring sufficiently few CSI-RS. It may also be appropriate where the network configures non-zero power CSI-RS but makes sure that it collides with zero-power CSI-RS in neighboring cells.

Cyclic Prefix Characteristics of Interference

In certain embodiments, characterization data may include cyclic prefix characteristics for a cell 204A associated with first wireless device 206A or neighboring cell 204B.

In principle, different cells may use different cyclic prefix length, which may be normal or extended. The cyclic prefix length should be known by first wireless device 110A in order to correctly demodulate the OFDM symbols. Accordingly, in certain embodiments, characterization data may indicate which cyclic prefix is in use in all the neighbor cells to enable first wireless device 110A to demodulate and/or decode the neighbor cell information. According to one embodiment, network node 206A signals the cyclic prefix length information associated with each neighbor cell. In another embodiment, network node 206 sends a single cyclic prefix length, and first wireless device 110A may assume that the same cyclic prefix is used by all neighboring cells. In this latter case, the network coordinates the use of a certain cyclic prefix length within the neighbor cells.

Though the characterization data may indicate the cyclic prefixes in use in some embodiments, it is generally recognized that the characterization data may instead identify the cyclic prefix lengths not in use in other embodiments.

Modulation Order Characteristics of Interference

In certain embodiments, the characterization data may include modulation order characteristics for a cell 204A associated with first wireless device 206A or neighboring cell 204B.

The modulation order and, in general, the modulation and coding scheme may change according to the scheduling characteristics of the network. A modulation coding scheme (MCS) definition in the network node 206A or 2068 may follow channel quality indicator reporting. Accordingly, the MCS definition may indicate the best MCS that may be received with a certain block error rate. In one particular example, the granularity can be as fine as a single resource block pair similar to PDSCH resource allocation.

For purposes of interference cancellation, the modulation order may be required information for certain types of wireless devices. For example, modulation order may be essential for a first wireless device 110A that operates to decode the neighbor cell interference. In a code-word level advanced receiver, the exact MSC order is needed. Such information may also be useful for wireless devices 110A that are symbol level receivers that operate to demodulate the interfering cell signals.

In certain embodiments, the characterization data may identify to first wireless device 110A, which modulation order or orders the interference may be assumed to use. The characterization data may be applicable to the whole network and, thus, applicable to all interfering PDSCH signals. In other embodiments, the characterization data may be applicable to a specific cell or cells. This type of characterization data assistance may be suitable for interference due to PDSCH transmissions since that is currently the only physical channel that supports anything other than QPSK modulation. Modulation order indication would in practice imply some kind of restriction on the modulation order in the network or in specific cells. For interfering signals stemming from PDSCH transmissions to cell-edge wireless devices, the likelihood of higher order modulation decreases and is likely to restrict network flexibility.

It may be recognized that explicit dynamic signaling may be expensive due to fine resource allocation and very fine granularity according to which the modulation order can change. Accordingly, in particular embodiments, the characterization data may inform the set of consecutive resource blocks over which the modulation order is constant for a certain neighbor interferer. In other embodiments, the grouping of resource blocks may be done based on sub-bands or a scaled version of the sub-bands. According to still other embodiments, the grouping of resource blocks may be based on resource block granularity Under an alternative embodiment the network inform that a constant modulation order is used for the entire PDSCH allocation. Under an alternative example embodiment the network signals explicitly the one or more modulation orders for each neighbor cell by considering the grouping in the previous embodiments.

Synchronization Characteristics of Interference

In certain embodiments, the characterization data may include synchronization characteristics for a cell 204A associated with first wireless device 206A or neighboring cell 204B.

In general, advanced wireless devices may be assumed to work well under the assumption of synchronized network. In particular embodiments, network node 206A may signal first wireless device 110A as to whether it should consider all the neighbour cells as synchronized. According to another embodiment, network node 206A signals first wireless device 110A as to which cell or cells among the neighbouring cells that are not synchronized. Alternatively, network node 206A may inform first wireless device 110A that the network is not synchronized. First wireless device 110A may then determine not to attempt advanced interference mitigation and, thus, potentially save battery power.

Returning to FIG. 13, the method continues after the transmission of characterization data from network node 206A to first wireless device 110A.

At step 1308, first wireless device 110A receives the characteristic data identifying at least one characteristic of an interfering signal intended for a second wireless device 110B. As described above, the characteristic data may be received from a network node such as network node 206A or 208 that provides telecommunications services to first wireless device 110A within a cell coverage area associated with the network node 206A or 208.

At step 1310, first wireless device 110A may use the characteristic data including the at least one characteristic to form an estimate the interfering signal. Based on the estimate of the interfering signal, first wireless device 110A may then mitigate the interference caused by the interfering signal that was intended for second wireless device 110B based on the estimate of the interfering signal at step 1312. The method may then conclude.

Figure 14:
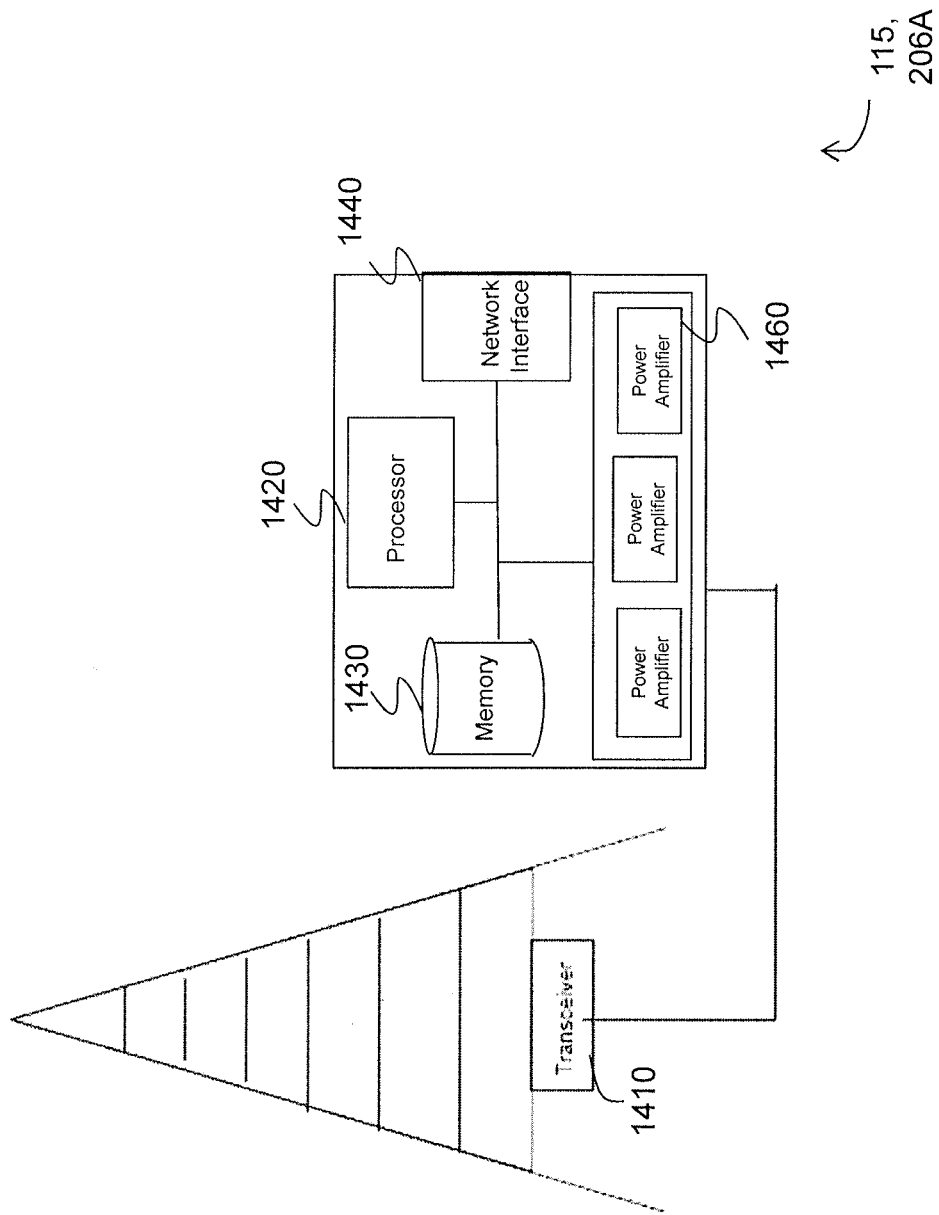
FIG. 14 is a block diagram illustrating certain embodiments of a radio network node, according to certain embodiments.

FIG. 14 is a block diagram illustrating certain embodiments of a radio network node 115, 206A. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogeneous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 1410, processor 1420, memory 1430, network interface 1440, and one or more power amplifiers 1460. In some embodiments, transceiver 1410 facilitates transmitting wireless signals to and receiving wireless signals from wireless device 110 (e.g., via an antenna), processor 1420 executes instructions to provide some or all of the functionality described above as being provided by a radio network node 115, memory 1430 stores the instructions executed by processor 1420, and network interface 1440 communicates signals to backend network components, such as a gateway, switch, router, Internet, Public Switched Telephone Network (PSTN), core network nodes 130, radio network controllers 120, etc.

Processor 1420 may include any suitable combination of hardware and software implemented in one or more modules to execute instructions and manipulate data to perform some or all of the described functions of radio network node 115. In some embodiments, processor 1420 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processor 1420 and may refer to any suitable device operable to receive input for radio network node 115, send output from radio network node 115, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of radio network node 115 may include additional components beyond those shown in FIG. 14 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 15:
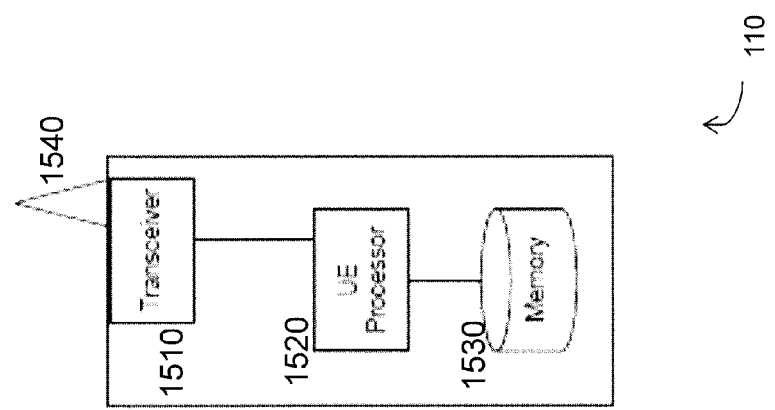
FIG. 15 is a block diagram illustrating certain embodiments of a wireless device, according to certain embodiments.

FIG. 15 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1510, processor 1520, and memory 1530. In some embodiments, transceiver 1510 facilitates transmitting wireless signals to and receiving wireless signals from radio network node 115 (e.g., via an antenna), processor 1520 executes instructions to provide some or all of the functionality described above as being provided by wireless device 110, and memory 1530 stores the instructions executed by processor 1520.

Processor 1520 may include any suitable combination of hardware and software implemented in one or more modules to execute instructions and manipulate data to perform some or all of the described functions of wireless device 110. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 15 that may be responsible for providing certain aspects of the wireless device's functionality, including any of the functionality described above and/or any additional functionality (including any functionality necessary to support the solution described above).

Figure 16:
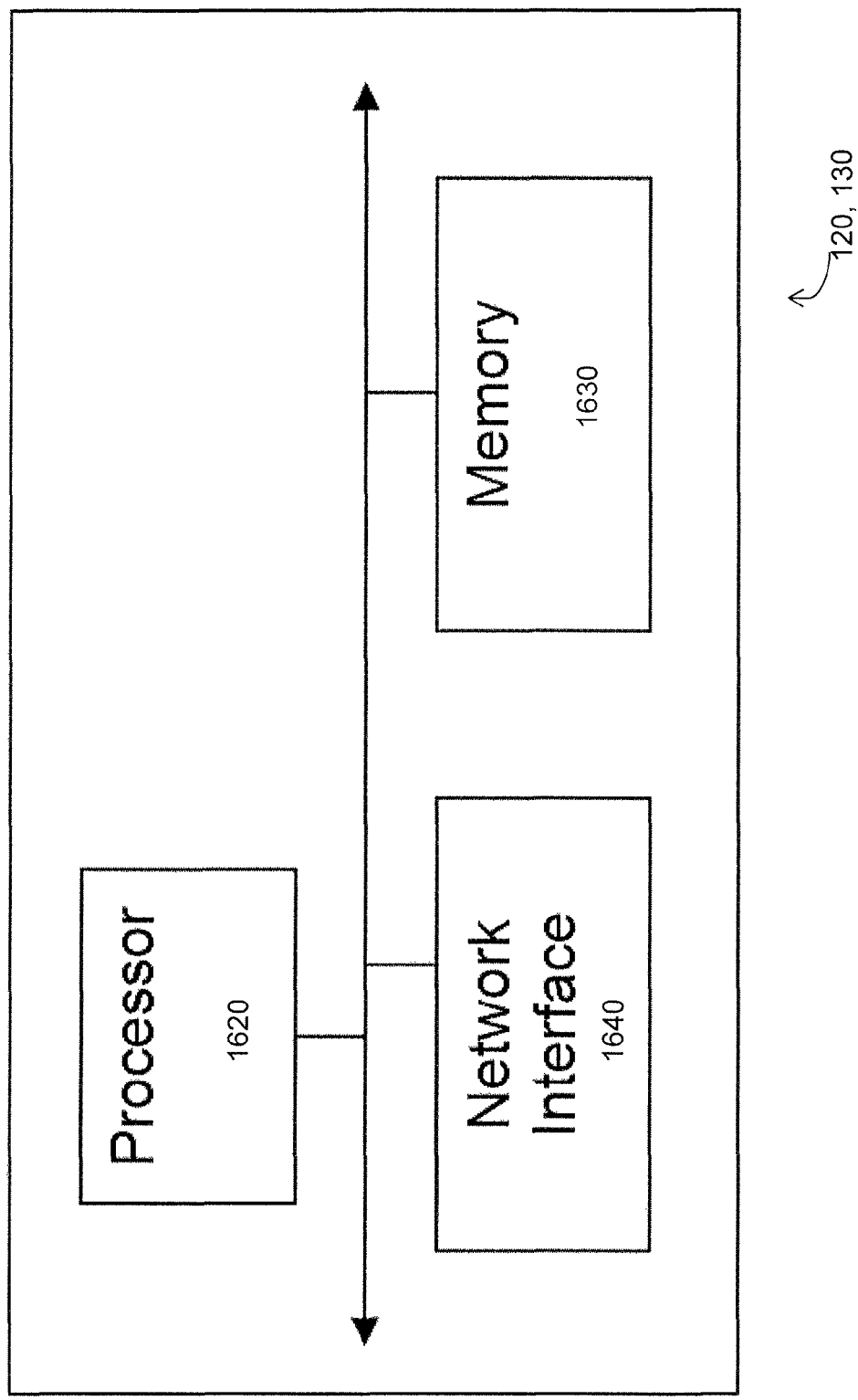
FIG. 16 is a block diagram illustrating certain embodiments of a core network node, according to certain embodiments.

FIG. 16 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 1620, memory 1630, and network interface 1640. In some embodiments, processor 1620 executes instructions to provide some or all of the functionality described above as being provided by the network node, memory 1630 stores the instructions executed by processor 1620, and network interface 1640 communicates signals to a suitable node, such as a gateway, switch, router, Internet, Public Switched Telephone Network (PSTN), radio network nodes 115, radio network controllers 120, core network nodes 130, etc.

Processor 1620 may include any suitable combination of hardware and software implemented in one or more modules to execute instructions and manipulate data to perform some or all of the described functions of the network node. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1640 is communicatively coupled to processor 1620 and may refer to any suitable device operable to receive input for the network node, send output from the network node, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of the network node may include additional components beyond those shown in FIG. 16 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, the systems and methods allow wireless devices to spend less effort on blind estimation and detection of various characteristics of the interference when performing various forms of interference cancellation and/or mitigation techniques. As a result, one technical advantage may be that the reduction of effort by a wireless device lowers device complexity. An additional technical advantage may be increased performance since the provided characterization data decreases the search space that a wireless device must consider. Accordingly, the risk of making erroneous estimation and detection is decreased. Still another advantage may be that battery consumption by the wireless device may be lowered. Still yet another advantage may that designers of wireless devices may apply tighter tolerances and/or thresholds to various blind estimation and detection techniques.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the invention is equally applicable in the uplink.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for providing interference characterization data by a network node for interference mitigation, comprising:
   providing, by the network node, telecommunications services for a first wireless device associated with the network node;
   identifying, by the network node, characteristic data associated with at least one characteristic of an interfering signal associated with a second wireless device; and
   transmitting, to the first wireless device, the characteristic data associated with the interfering signal associated with the second wireless device, and
   wherein the at least one characteristic is tied to a cell identifier and identifies a precoder granularity configured for least one physical resource block pair associated with the interfering signal.

2. The method of claim 1, wherein the at least one characteristic data is associated with a neighboring cell associated with the interfering signal.

3. The method of claim 1, wherein the at least one characteristic identifies at least one precoder codebook that may be associated with the interfering signal.

4. The method of claim 1, wherein the at least one characteristic identifies a subset of precoders within at least one precoder codebook that may be associated with the interfering signal.

5. The method of claim 1, wherein the at least one characteristic identifies at least one precoder codebook that may not be associated with the interfering signal.

6. The method of claim 1, wherein the at least one characteristic identifies a subset of precoders within at least one precoder codebook that may not be associated with the interfering signal.

7. The method of claim 1, wherein the at least one characteristic indicates that a selected precoder codebook may be used across all scheduled resource blocks of the interfering signal.

8. The method of claim 1, wherein the at least one characteristic identifying a precoder granularity comprises an indication that a selected precoder codebook may be used for resource blocks of the interfering signal at a configurable frequency.

9. The method of claim 1, wherein the at least one characteristic comprises a plurality of characteristics associated with a plurality of interference signals tied to the cell identifier of a neighboring cell coverage area.

10. The method of claim 1, wherein the cell identifier is associated with a cell coverage area associated with the network node.

11. The method of claim 1, wherein the characteristic data is transmitted to the first wireless device in a dedicated signal addressed to the first wireless device.

12. The method of claim 1, wherein the at least one characteristic applies to a plurality of interfering signals received by the first wireless device.

13. The method of claim 1, wherein the at least one characteristic is transmitted using a higher layer signaling selected from the group consisting of RRC and MAC.

14. The method of claim 1, wherein the at least one characteristic is transmitted using a downlink control channel selected from the group consisting of PDCCH and ePDCCH.

15. A network node for providing interference characterization data, the network node comprising:
memory containing executable instructions; and
one or more processors in communication with the memory, the one or more processors operable to execute the instructions to cause the network node to:
provide telecommunications services for a first wireless device associated with the network node;
identify characteristic data associated with at least one characteristic of an interfering signal associated with a second wireless device; and
transmit, to the first wireless device, the characteristic data associated with the interfering signal associated with the second wireless device, and
wherein the at least one characteristic is tied to a cell identifier and identifies a precoder granularity configured for least one physical resource block pair associated with the interfering signal.

16. The network node of claim 15, wherein the at least one characteristic data is associated with a neighboring cell associated with the interfering signal.

17. The network node of claim 15, wherein the at least one characteristic identifies at least one precoder codebook that may be associated with the interfering signal.

18. The network node of claim 15, wherein the at least one characteristic identifies a subset of precoders within at least one precoder codebook that may be associated with the interfering signal.

19. The network node of claim 15, wherein the at least one characteristic identifies at least one precoder codebook that may not be associated with the interfering signal.

20. The network node of claim 15, wherein the at least one characteristic identifies a subset of precoders within at least one precoder codebook that may not be associated with the interfering signal.

21. The network node of claim 15, wherein the at least one characteristic indicates that a selected precoder codebook may be used across all schedule resource blocks of the interfering signal.

22. The network node of claim 15, wherein the at least one characteristic identifying a precoder granularity comprises an indication that a selected precoder codebook may be used for resource blocks of the interfering signal at a configurable frequency.

23. The network node of claim 15, wherein the at least one characteristic comprises a plurality of characteristics associated with a plurality of interference signals tied to the cell identifier of a neighboring cell coverage area.

24. The network node of claim 15, wherein the cell identifier is associated with a cell coverage area associated with the network node.

25. The network node of claim 15, wherein the characteristic data is transmitted to the first wireless device in a dedicated signal addressed to the first wireless device.

26. The network node of claim 15, wherein the at least one characteristic applies to a plurality of interfering signals received by the first wireless device.

27. The network node of claim 15, wherein the at least one characteristic is transmitted using a higher layer signaling selected from the group consisting of RRC and MAC.

28. The network node of claim 15, wherein the at least one characteristic is transmitted using a downlink control channel selected from the group consisting of PDCCH and ePDCCH.

29. A method for using interference characterization data by a first wireless device for interference mitigation, comprising:
receiving, by the first wireless device, characteristic data identifying at least one characteristic of an interfering signal intended for a second wireless device, the characteristic data received from a network node providing telecommunications services to the first wireless device;
using, by the first wireless device, the characteristic data comprising the at least one characteristic to form an estimate of some characteristic related to the interfering signal; and
mitigating, by the first wireless device, the interfering signal intended for the second wireless device based on the estimate of the some characteristic related to the interfering signal, and
wherein the at least one characteristic is tied to a cell identifier and identifies a precoder granularity configured for least one physical resource block pair associated with the interfering signal.

30. The method of claim 29, wherein the at least one characteristic data is associated with a neighboring cell associated with the interfering signal.

31. The method of claim 29, wherein the at least one characteristic identifies at least one precoder codebook that may be associated with the interfering signal.

32. The method of claim 29, wherein the at least one characteristic identifies a subset of precoders within at least one precoder codebook that may be associated with the interfering signal.

33. The method of claim 29, wherein the at least one characteristic identifies at least one precoder codebook that may not be associated with the interfering signal.

34. The method of claim 30, wherein the at least one characteristic identifies a subset of precoders within at least one precoder codebook that may not be associated with the interfering signal.

35. The method of claim 29, wherein the at least one characteristic indicates that a selected precoder codebook may be used across all schedule resource blocks of the interfering signal.

36. The method of claim 29, wherein the at least one characteristic identifying a precoder granularity comprises an indication that a selected precoder codebook may be used for resource blocks of the interfering signal at a configurable frequency.

37. A first wireless device using interference characterization data for interference mitigation, the first wireless device comprising:
   memory containing executable instructions; and
   one or more processors in communication with the memory the one or more processors operable to execute the instructions to cause the first wireless device to:
      receive characteristic data identifying at least one characteristic of an interfering signal intended for a second wireless device, the characteristic data received from a network node providing telecommunications services to the first wireless device;
      use the characteristic data comprising the at least one characteristic to form an estimate of some characteristic related to the interfering signal; and
      mitigate, by the first wireless device, the interfering signal intended for the second wireless device based on the estimate of the some characteristic related to the interfering signal, and
   wherein the at least one characteristic is tied to a cell identifier and identifies a precoder granularity configured for least one physical resource block pair associated with the interfering signal.

38. The first wireless device of claim 37, wherein the at least one characteristic data is associated with a neighboring cell associated with the interfering signal.

39. The first wireless device of claim 37, wherein the at least one characteristic identifies at least one precoder codebook that may be associated with the interfering signal.

40. The first wireless device of claim 37, wherein the at least one characteristic identifies a subset of precoders within at least one precoder codebook that may be associated with the interfering signal.

41. The first wireless device of claim 37, wherein the at least one characteristic identifies at least one precoder codebook that may not be associated with the interfering signal.

42. The first wireless device of claim 37, wherein the at least one characteristic identifies a subset of precoders within at least one precoder codebook that may not be associated with the interfering signal.

43. The first wireless device of claim 37, wherein the at least one characteristic indicates that a selected precoder codebook may be used across all schedule resource blocks of the interfering signal.

44. The first wireless device of claim 37, wherein the at least one characteristic identifying a precoder granularity comprises an indication that a selected precoder codebook may be used for resource blocks of the interfering signal at a configurable frequency.

* * * * *